(12) United States Patent
Palmer et al.

(10) Patent No.: US 11,987,223 B2
(45) Date of Patent: May 21, 2024

(54) WHEEL CHOCK AND METHOD

(71) Applicant: 9172-9863 QUEBEC INC., Terrebonne (CA)

(72) Inventors: Gregory Palmer, Mascouche (CA); Daniel Grothe, Terrebonne (CA); Etienne Ayotte, Repentigny (CA); Gaetan Jette, Mascouche (CA)

(73) Assignee: 9172-9863 QUEBEC INC., Terrebonne (CA)

( * ) Notice: Subject to any disclaimer, the term of this patent is extended or adjusted under 35 U.S.C. 154(b) by 0 days.

(21) Appl. No.: 17/971,306

(22) Filed: Oct. 21, 2022

(65) Prior Publication Data
US 2023/0038387 A1 Feb. 9, 2023

Related U.S. Application Data

(63) Continuation of application No. 17/120,777, filed on Dec. 14, 2020, now Pat. No. 11,479,217, which is a
(Continued)

(51) Int. Cl.
*B60T 3/00* (2006.01)
*B60P 3/077* (2006.01)
(Continued)

(52) U.S. Cl.
CPC ............ *B60T 3/00* (2013.01); *B60P 3/077* (2013.01); *B64F 1/16* (2013.01); *B65G 69/005* (2013.01)

(58) Field of Classification Search
CPC ... B60T 3/00; B60P 3/077; B64F 1/16; B65G 69/005; B65G 69/003; Y10T 70/5841
See application file for complete search history.

(56) References Cited

U.S. PATENT DOCUMENTS

| 2,316,178 A | 4/1943 | Morgensen, Jr. |
| 2,413,744 A | 1/1947 | Carter |

(Continued)

FOREIGN PATENT DOCUMENTS

| CA | 2164737 A1 | 6/1997 |
| CA | 2164738 C | 3/2009 |

(Continued)

OTHER PUBLICATIONS

Machine translation in English of CA2164737.
(Continued)

*Primary Examiner* — Xuan Lan Nguyen
(74) *Attorney, Agent, or Firm* — RYAN KROMHOLZ & MANION, S.C.

(57) ABSTRACT

The wheel chock is part of a wheel chock restraint system that also includes a base plate to prevent a parked vehicle from moving away in an unauthorized or accidental manner in a departure direction. The wheel chock includes a main body having a bottom base portion and a tire-engaging bulge. It also includes a tire deformation cavity, made within the main body on the tire-facing side. Teeth are provided underneath the bottom base portion of the wheel chock to engage at least one of the corresponding teeth provided on the base plate in a latched engagement. The wheel chock has an improved resistance to rollover and tipping when the wheel is pressed forcefully against the wheel chock.

27 Claims, 26 Drawing Sheets

Related U.S. Application Data continuation of application No. 15/167,497, filed on May 27, 2016, now Pat. No. 10,864,895, which is a continuation of application No. PCT/CA2014/051143, filed on Nov. 28, 2014.

(60) Provisional application No. 61/910,264, filed on Nov. 29, 2013.

(51) Int. Cl.
*B64F 1/16* (2006.01)
*B65G 69/00* (2006.01)

(56) References Cited

U.S. PATENT DOCUMENTS

| | | |
|---|---|---|
| 2,465,551 A | 3/1949 | Otterness |
| 2,697,494 A | 12/1954 | Parks |
| 2,771,162 A | 11/1956 | Marsh |
| 2,835,349 A | 5/1958 | Veselik et al. |
| 2,858,905 A | 11/1958 | Fahland |
| 2,954,101 A | 9/1960 | Corson |
| 3,065,827 A | 11/1962 | Timbers |
| 3,074,569 A | 1/1963 | Ajero |
| 3,077,247 A | 2/1963 | West et al. |
| 3,119,466 A | 1/1964 | Gilson |
| 3,120,292 A | 2/1964 | Rambat |
| 3,157,194 A | 11/1964 | Stolte |
| 3,189,127 A | 6/1965 | Karnow et al. |
| 3,258,088 A | 6/1966 | Bowen |
| 3,305,049 A | 2/1967 | Willey |
| 3,321,046 A | 5/1967 | Cooper |
| 3,425,517 A | 2/1969 | Speir |
| 3,542,157 A | 11/1970 | Noah |
| 3,581,846 A | 6/1971 | Janus |
| 3,664,466 A | 5/1972 | Rotheiser |
| 3,666,119 A | 5/1972 | Parsons |
| 3,695,394 A | 10/1972 | Carpenter |
| 3,700,077 A | 10/1972 | Harder |
| 3,734,241 A | 5/1973 | Hale |
| 3,845,844 A | 11/1974 | Woerner |
| 3,845,845 A | 11/1974 | Geisthoff |
| 3,907,072 A | 9/1975 | Shafer |
| 4,155,429 A | 5/1979 | Schessl |
| 4,155,523 A | 5/1979 | Morford et al. |
| 4,191,503 A | 3/1980 | Neff et al. |
| 4,207,019 A | 6/1980 | Cone |
| 4,217,831 A | 8/1980 | Koliba et al. |
| 4,399,893 A | 8/1983 | Switzer |
| 4,441,586 A | 4/1984 | Bernier |
| 4,555,211 A | 11/1985 | Metz |
| 4,582,176 A | 4/1986 | Roberts |
| 4,641,994 A | 2/1987 | Hankison |
| 4,674,929 A | 6/1987 | Blunden |
| 4,676,344 A | 6/1987 | Locicero |
| 4,682,922 A | 7/1987 | Andre et al. |
| 4,739,863 A | 4/1988 | Stauffer |
| 4,781,271 A | 11/1988 | Wokeck |
| 4,784,567 A | 11/1988 | Hageman et al. |
| 4,804,070 A | 2/1989 | Bohler |
| 4,804,302 A | 2/1989 | Andre |
| 4,833,442 A | 5/1989 | Von Heck |
| 4,854,790 A | 8/1989 | Andre |
| 4,934,489 A | 6/1990 | Jackson |
| 4,955,459 A | 9/1990 | Murphy |
| 4,963,068 A | 10/1990 | Gelder |
| 4,969,792 A | 11/1990 | Ellis et al. |
| 4,973,213 A | 11/1990 | Erlandsson |
| 5,025,877 A | 6/1991 | Assh |
| 5,096,021 A | 3/1992 | Tart |
| D326,254 S | 5/1992 | Ziaylek, Jr. et al. |
| 5,173,018 A | 12/1992 | Kissel et al. |
| 5,249,905 A | 10/1993 | Warner et al. |
| 5,286,138 A | 2/1994 | Goodwin |
| 5,302,063 A | 4/1994 | Winsor |
| 5,312,213 A | 5/1994 | Winsor |
| 5,348,437 A | 9/1994 | Krupke et al. |
| 5,368,134 A | 11/1994 | Rickman et al. |
| 5,375,965 A | 12/1994 | Springer et al. |
| 5,381,680 A | 1/1995 | Rauch, Jr. |
| 5,392,880 A | 2/1995 | Christian |
| 5,410,897 A | 5/1995 | Edmondson |
| 5,427,209 A | 6/1995 | Tannehill et al. |
| 5,435,418 A | 7/1995 | Warren et al. |
| 5,520,034 A | 5/1996 | Edmondson |
| 5,531,557 A | 7/1996 | Springer |
| 5,547,045 A | 8/1996 | Stutzman |
| 5,553,987 A | 9/1996 | Ellis |
| 5,582,498 A | 12/1996 | Springer et al. |
| 5,664,930 A | 9/1997 | Ellis |
| 5,683,219 A | 11/1997 | Gilles, Jr. et al. |
| 5,709,518 A | 1/1998 | Alexander et al. |
| 5,743,697 A | 4/1998 | Alexander |
| 5,762,459 A | 6/1998 | Springer et al. |
| 5,803,208 A | 9/1998 | Blach |
| 5,878,940 A | 3/1999 | Rosenbalm |
| 5,901,816 A | 5/1999 | Camilleri |
| 5,902,082 A | 5/1999 | Kaemper |
| 5,934,857 A | 8/1999 | Alexander |
| D422,960 S | 4/2000 | Henry |
| 6,082,952 A | 7/2000 | Alexander |
| 6,092,970 A | 7/2000 | Hahn et al. |
| 6,123,496 A | 9/2000 | Alexander |
| 6,238,163 B1 | 5/2001 | Springer et al. |
| 6,250,432 B1 | 6/2001 | Hageman et al. |
| 6,290,029 B1 | 9/2001 | Gubler et al. |
| 6,336,527 B1 | 1/2002 | Metz |
| 6,357,987 B1 | 3/2002 | Palus |
| 6,368,043 B1 | 4/2002 | Leum et al. |
| 6,371,253 B1 | 4/2002 | Berends et al. |
| 6,378,956 B1 | 4/2002 | Van De Walker |
| 6,425,465 B1 | 7/2002 | Tallman et al. |
| 6,439,823 B1 | 8/2002 | Lambert |
| 6,505,713 B1 | 1/2003 | Paul et al. |
| 6,524,053 B2 | 2/2003 | Hahn et al. |
| 6,585,211 B1 | 7/2003 | Hageman et al. |
| 6,589,003 B2 | 7/2003 | Berends |
| 6,676,360 B2 | 1/2004 | Springer et al. |
| 6,725,979 B1 | 4/2004 | Snook |
| 6,752,381 B2 | 6/2004 | Colak et al. |
| 6,773,221 B2 | 8/2004 | Belongia et al. |
| 6,835,034 B2 | 12/2004 | Winsor |
| 6,851,523 B1 | 2/2005 | Gaster |
| 6,863,481 B2 | 3/2005 | Pingel |
| 6,926,480 B2 | 8/2005 | Anderson et al. |
| 6,938,734 B2 | 9/2005 | Curl |
| 6,948,593 B2 | 9/2005 | Horton |
| 6,978,865 B2 | 12/2005 | Fougere |
| 7,000,740 B2 | 2/2006 | Chrisco et al. |
| 7,032,720 B2 | 4/2006 | Jette et al. |
| 7,036,637 B1 | 5/2006 | Wiens |
| 7,044,698 B2 | 5/2006 | Winsor |
| 7,128,508 B2 | 10/2006 | Anderson et al. |
| 7,168,527 B2 | 1/2007 | Bateman |
| 7,226,265 B2 | 6/2007 | Wilson |
| 7,264,092 B2 | 9/2007 | Jette |
| 7,284,641 B1 | 10/2007 | Spence, III |
| 7,299,902 B2 | 11/2007 | Thorpe |
| 7,316,043 B2 | 1/2008 | Henblad et al. |
| 7,537,095 B2 | 5/2009 | Eriksson |
| 7,586,401 B2 | 9/2009 | Payne |
| 7,632,052 B2 | 12/2009 | Tatina |
| D633,850 S | 3/2011 | Morin |
| 7,914,042 B2 | 3/2011 | Andersen et al. |
| 7,958,973 B2 | 6/2011 | Swasand |
| D644,159 S | 8/2011 | Marcum |
| 7,999,680 B2 | 8/2011 | Penot |
| 8,006,811 B2 | 8/2011 | Andersen et al. |
| 8,047,751 B2 | 11/2011 | Powers et al. |
| 8,104,588 B2 | 1/2012 | Curlee et al. |
| 8,286,757 B2 | 10/2012 | Nelson |
| 8,286,997 B2 | 10/2012 | Kimener et al. |
| 8,307,956 B2 | 11/2012 | Andersen et al. |
| 8,365,875 B2 | 2/2013 | Garceau |

(56) References Cited

U.S. PATENT DOCUMENTS

| | | | |
|---|---|---|---|
| 8,443,945 B2 | 5/2013 | Perkins |
| 8,464,846 B2 | 6/2013 | Andersen et al. |
| 8,465,245 B2 | 6/2013 | Manone et al. |
| 8,499,897 B2 | 8/2013 | Brooks et al. |
| 8,499,899 B2 | 8/2013 | Scott |
| 8,528,929 B2 | 9/2013 | Kimener |
| 8,562,264 B2 | 10/2013 | Winsor |
| 8,590,673 B2 | 11/2013 | Andersen et al. |
| 8,590,674 B2 | 11/2013 | Jette |
| 8,657,078 B2 | 2/2014 | Wolfram |
| 8,662,803 B2 | 3/2014 | Bowman et al. |
| 8,690,501 B2 | 4/2014 | Bullock |
| 8,779,948 B2 | 7/2014 | Faus et al. |
| 8,783,608 B2 | 7/2014 | Affre De Saint Rome |
| 8,807,291 B2 | 8/2014 | Saubade |
| 8,826,963 B2 | 9/2014 | Wiegel et al. |
| 8,831,970 B2 | 9/2014 | Weik, III et al. |
| 8,857,574 B2 | 10/2014 | De Jong |
| 8,869,948 B2 | 10/2014 | Saliger et al. |
| 8,887,874 B2 | 11/2014 | Bellota |
| D720,278 S | 12/2014 | Pinkall |
| 8,905,198 B2 | 12/2014 | Brooks et al. |
| 9,010,501 B2 | 4/2015 | Brooks et al. |
| 9,073,472 B2 | 7/2015 | Hellenschmidt et al. |
| 9,079,523 B2 | 7/2015 | Morin |
| 9,126,775 B2 | 9/2015 | Brooks et al. |
| 9,139,384 B2 | 9/2015 | Brooks, IV et al. |
| 9,162,831 B2 | 10/2015 | De Jong |
| 9,212,797 B2 | 12/2015 | Jeong |
| 9,290,336 B2 | 3/2016 | Ballester |
| 9,909,851 B2 | 3/2018 | Lanigan, Sr. et al. |
| D830,280 S | 10/2018 | Erickson |
| 10,179,572 B2 | 1/2019 | Metz et al. |
| D855,005 S | 7/2019 | Delancey et al. |
| 10,393,627 B2 | 8/2019 | Etches et al. |
| 10,501,058 B2 | 12/2019 | Rancourt et al. |
| D873,196 S | 1/2020 | Harrington |
| 10,625,961 B2 | 4/2020 | De Jong |
| D892,706 S | 8/2020 | Sveum et al. |
| 10,793,119 B2 | 10/2020 | Jette et al. |
| 10,864,895 B2 | 12/2020 | Palmer et al. |
| 11,007,920 B2 | 5/2021 | Vande Sande et al. |
| 11,046,298 B1 | 6/2021 | Desmarais et al. |
| 2001/0026751 A1 | 10/2001 | Berends |
| 2004/0108172 A1 | 6/2004 | Fox |
| 2005/0047887 A1 | 3/2005 | Kenny |
| 2005/0133315 A1 | 6/2005 | Hoofard |
| 2007/0050999 A1 | 3/2007 | Milner et al. |
| 2008/0124203 A1 | 5/2008 | McDonald |
| 2008/0314693 A1 | 12/2008 | Van Aspert |
| 2009/0169298 A1 | 7/2009 | Lane |
| 2011/0240416 A1* | 10/2011 | Brooks ............ B60T 3/00 188/32 |
| 2015/0027818 A1 | 1/2015 | Bellota |
| 2019/0329994 A1 | 10/2019 | Ion |
| 2020/0216276 A1 | 7/2020 | Palmer et al. |
| 2020/0354176 A1 | 11/2020 | Valentin |
| 2021/0031736 A1 | 2/2021 | Perozzo |
| 2021/0170997 A1 | 6/2021 | Widgery |
| 2021/0261101 A1 | 8/2021 | Chartier et al. |
| 2021/0316974 A1 | 10/2021 | Leum et al. |

FOREIGN PATENT DOCUMENTS

| | | |
|---|---|---|
| CN | 203111202 U | 8/2013 |
| DE | 609179 C | 2/1935 |
| DE | 633272 C | 7/1936 |
| DE | 19706326 C1 | 10/1998 |
| EP | 0025399 B1 | 3/1983 |
| EP | 0128992 A1 | 12/1984 |
| EP | 0284532 A1 | 9/1988 |
| EP | 0384850 B1 | 11/1994 |
| EP | 0537075 B1 | 4/1995 |
| EP | 0496727 B1 | 9/1996 |
| EP | 0639488 B1 | 3/1997 |
| EP | 0836579 B1 | 2/1999 |
| EP | 0744327 B1 | 11/1999 |
| EP | 1095880 A1 | 5/2001 |
| EP | 1167253 B1 | 4/2004 |
| EP | 1764275 B1 | 4/2009 |
| EP | 2236445 B1 | 4/2011 |
| EP | 2292481 B1 | 5/2013 |
| EP | 2089302 B1 | 11/2013 |
| EP | 2380833 B1 | 9/2014 |
| EP | 2307237 B1 | 1/2016 |
| EP | 2832669 B1 | 4/2016 |
| EP | 2851320 B1 | 11/2016 |
| EP | 2930130 B1 | 9/2017 |
| EP | 3159229 B1 | 6/2018 |
| EP | 3401251 A1 | 11/2018 |
| EP | 3210892 B1 | 1/2019 |
| EP | 3028966 B1 | 3/2019 |
| EP | 2796395 B1 | 10/2019 |
| EP | 3613685 B1 | 7/2021 |
| FR | 2652340 B1 | 1/1992 |
| FR | 2689845 B1 | 8/1996 |
| FR | 2750123 B1 | 8/1998 |
| FR | 2832113 B1 | 3/2004 |
| FR | 2869578 B1 | 6/2006 |
| FR | 2873351 B1 | 10/2006 |
| FR | 2982225 B1 | 12/2013 |
| FR | 3035387 B1 | 5/2017 |
| FR | 3039528 B1 | 9/2017 |
| FR | 3055008 B1 | 8/2018 |
| FR | 3095811 A1 | 11/2020 |
| GB | 774550 A | 5/1957 |
| GB | 779681 A | 7/1957 |
| GB | 2290590 B | 4/1998 |
| GB | 2410482 B | 1/2007 |
| GB | 2528380 B | 5/2021 |
| WO | 9749625 A1 | 12/1997 |
| WO | 2008098742 A1 | 8/2008 |
| WO | 2010029181 A1 | 3/2010 |
| WO | 2020221887 A1 | 11/2020 |
| WO | 2021073952 A1 | 4/2021 |
| WO | 2022016265 A1 | 1/2022 |

OTHER PUBLICATIONS

Machine translation in English of CA2164738.
Machine translation in English of CN203111202.
Machine translation in English of DE609179.
Machine translation in English of DE633272.
Machine translation in English of DE19706326.
Machine translation in English of EP0025399.
Machine translation in English of EP0128992.
Machine translation in English of EP0284532.
Machine translation in English of EP0384850.
Machine translation in English of EP0496727.
Machine translation in English of EP0537075.
Machine translation in English of EP0639488.
Machine translation in English of EP0836579.
Machine translation in English of EP1764275.
Machine translation in English of EP2089302.
Machine translation in English of EP2236445.
Machine translation in English of EP2292481.
Machine translation in English of EP2307237.
Machine translation in English of EP2380833.
Machine translation in English of EP2832669.
Machine translation in English of EP2851320.
Machine translation in English of EP2930130.
Machine translation in English of EP3159229.
Machine translation in English of EP3401251.
Machine translation in English of FR2652340.
Machine translation in English of FR2689845.
Machine translation in English of FR2750123.
Machine translation in English of FR2832113.
Machine translation in English of FR2869578.
Machine translation in English of FR2873351.
Machine translation in English of FR2982225.

(56) References Cited

OTHER PUBLICATIONS

Machine translation in English of FR3035387.
Machine translation in English of FR3039528.
Machine translation in English of FR3055008.
Machine translation in English of FR3095811.
Machine translation in English of WO9749625.
Machine translation in English of WO200898742.
Machine translation in English of WO201029181.
Machine translation in English of WO2020221887.

* cited by examiner

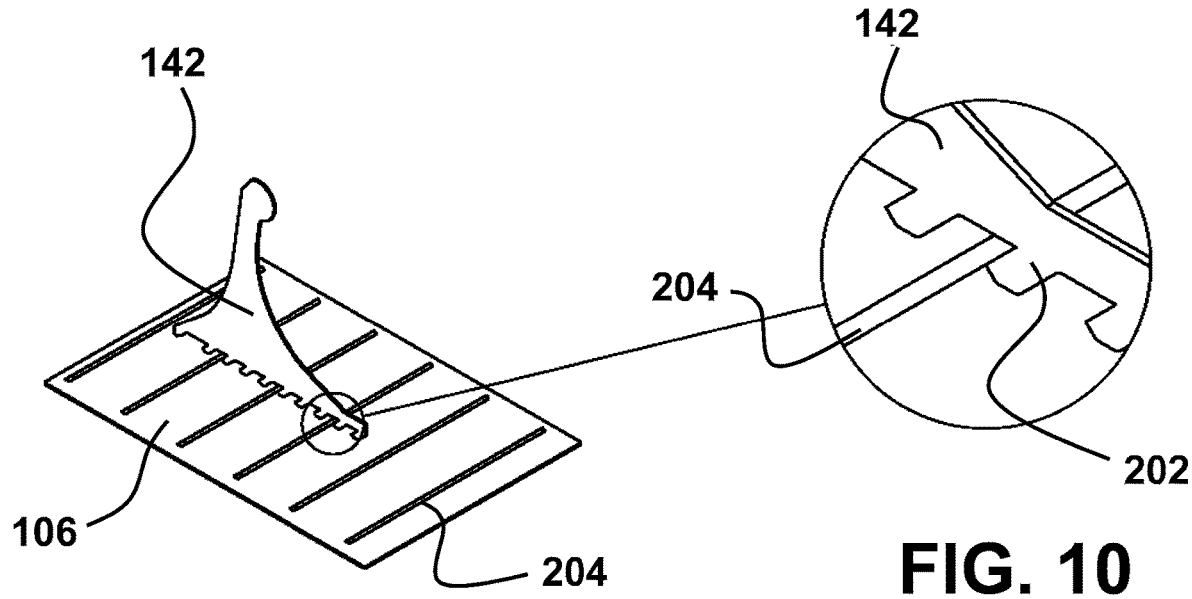
FIG. 9
FIG. 10
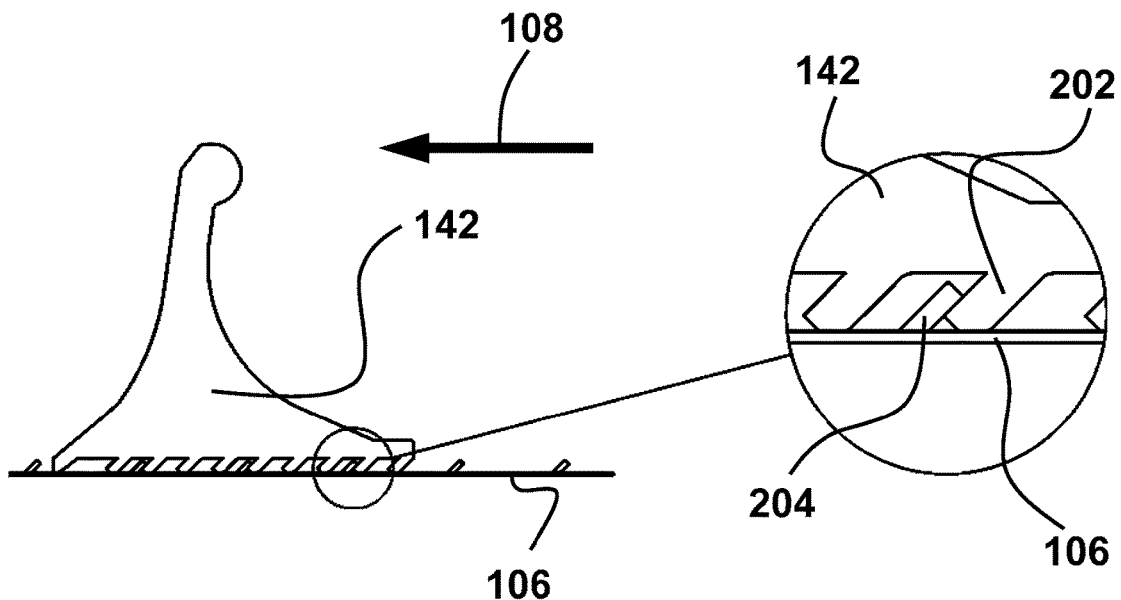
FIG. 11
FIG. 12

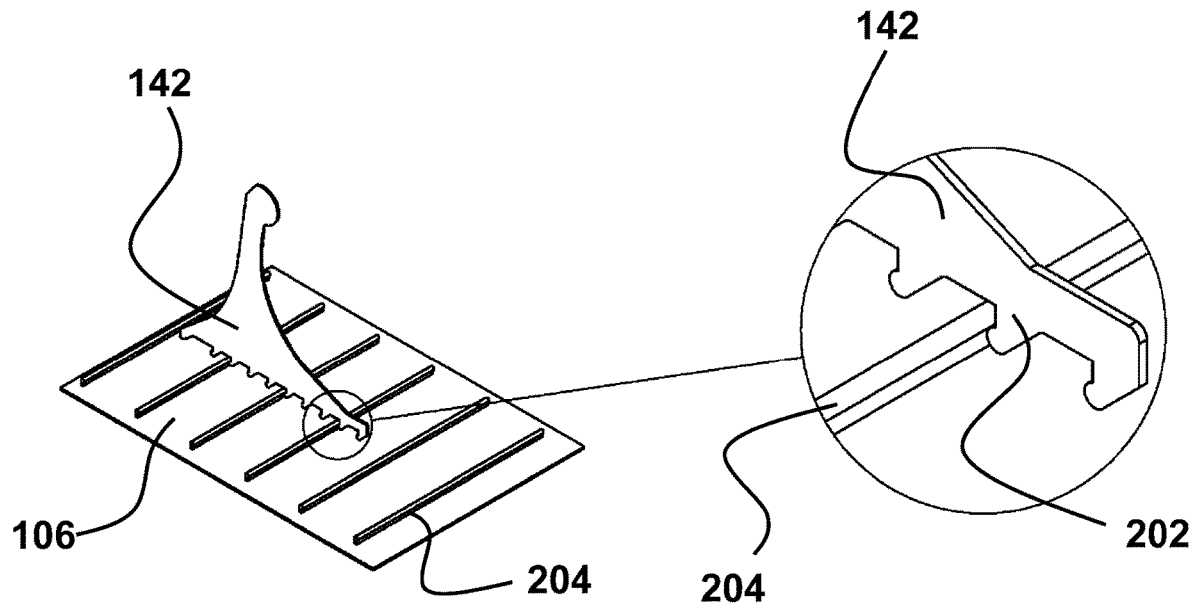
FIG. 13
FIG. 14
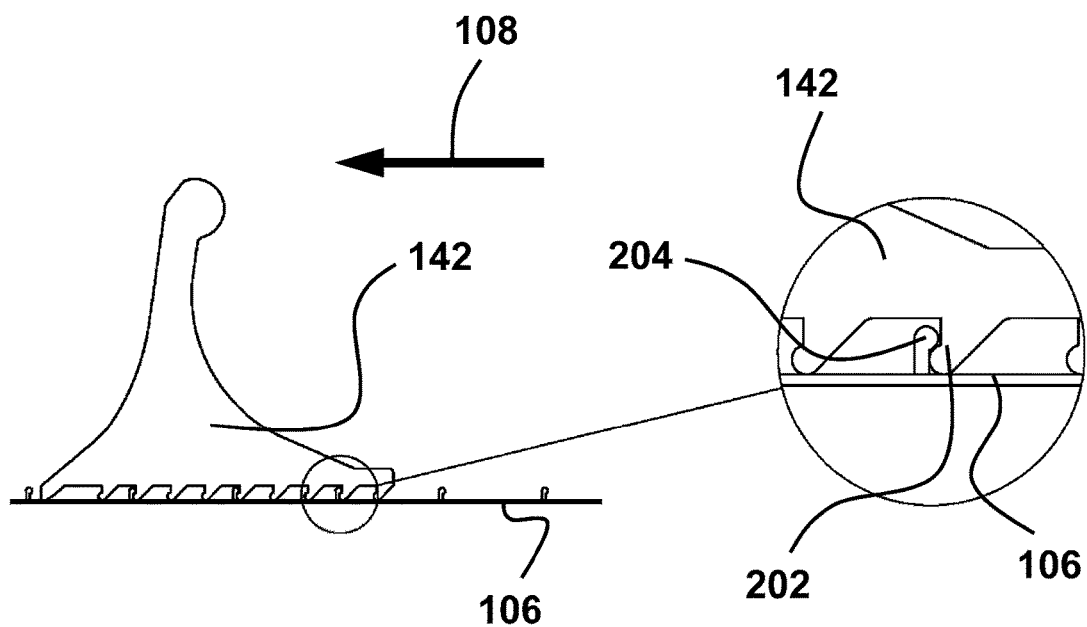
FIG. 15
FIG. 16

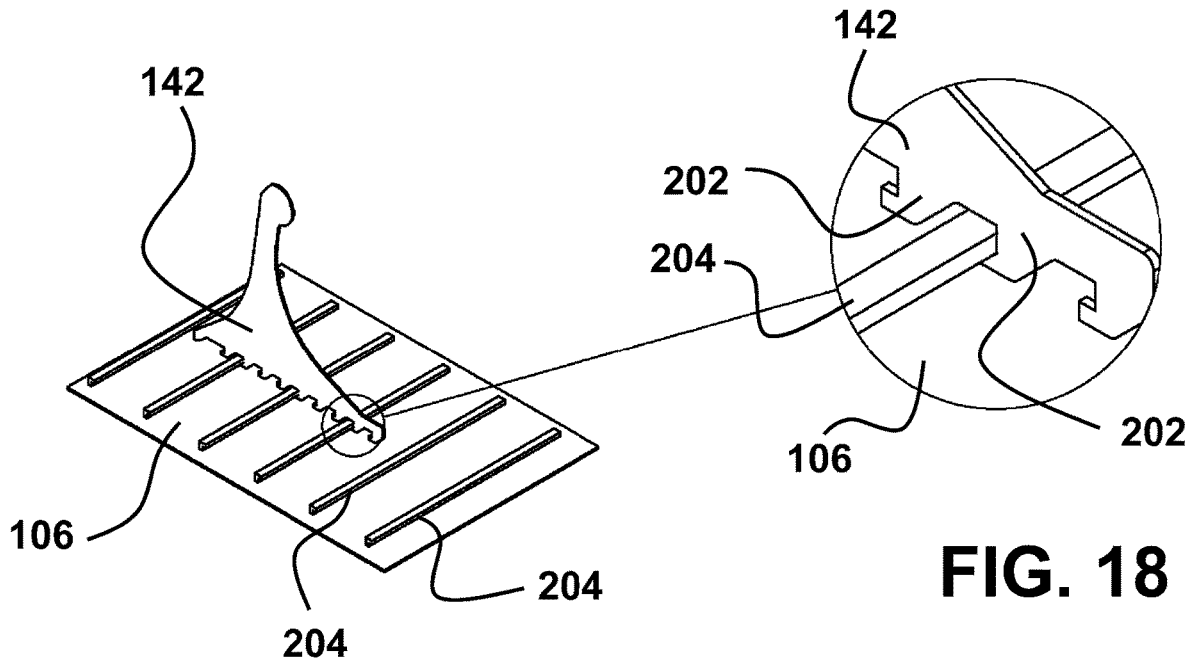
FIG. 17
FIG. 18
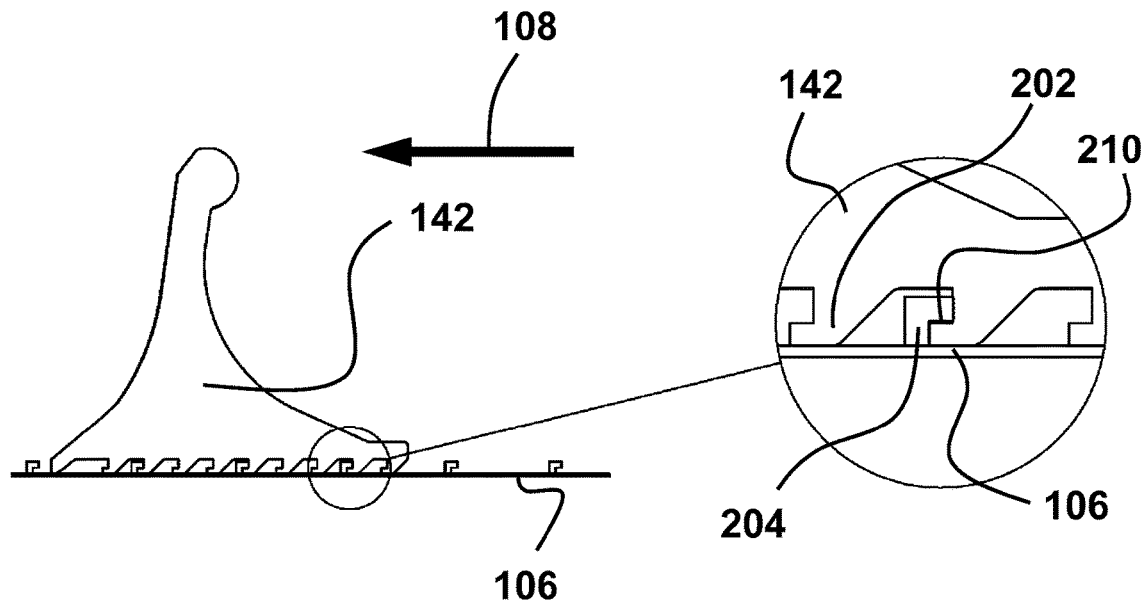
FIG. 19
FIG. 20

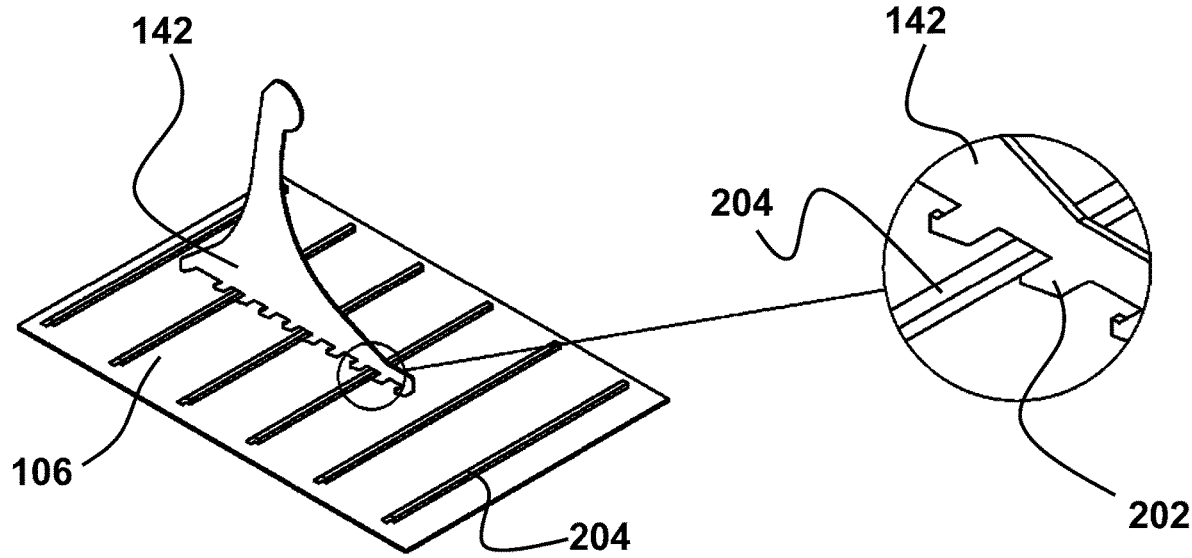
FIG. 21
FIG. 22
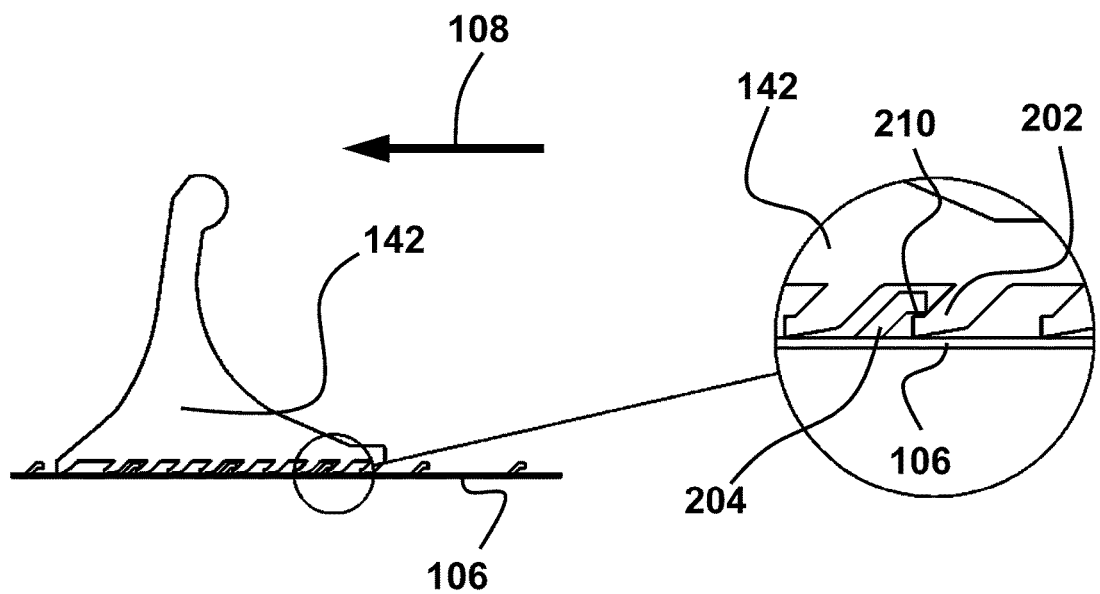
FIG. 23
FIG. 24

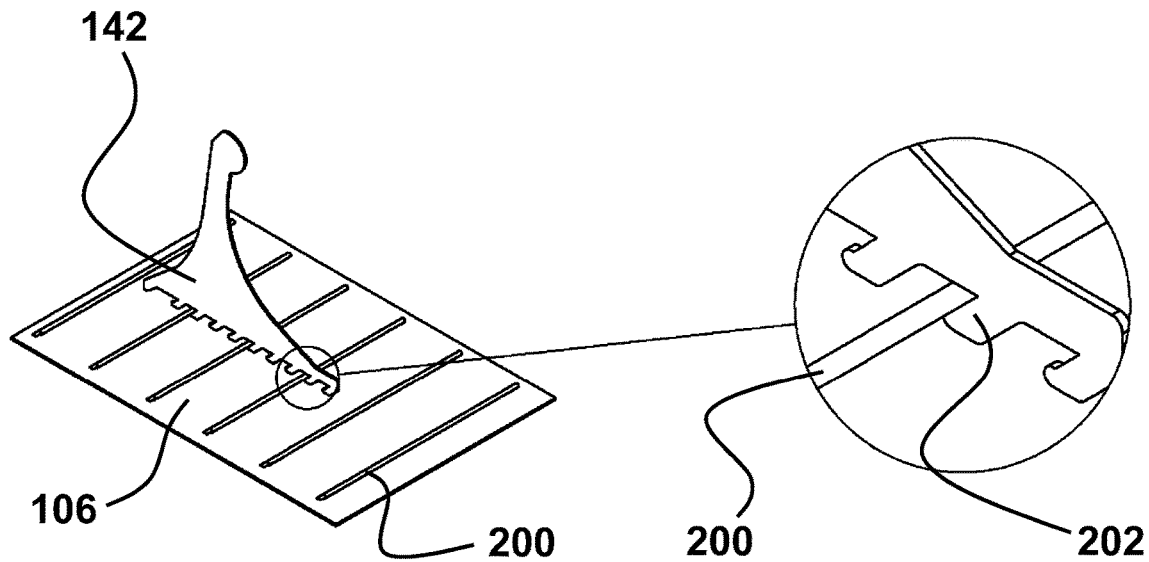
FIG. 25
FIG. 26
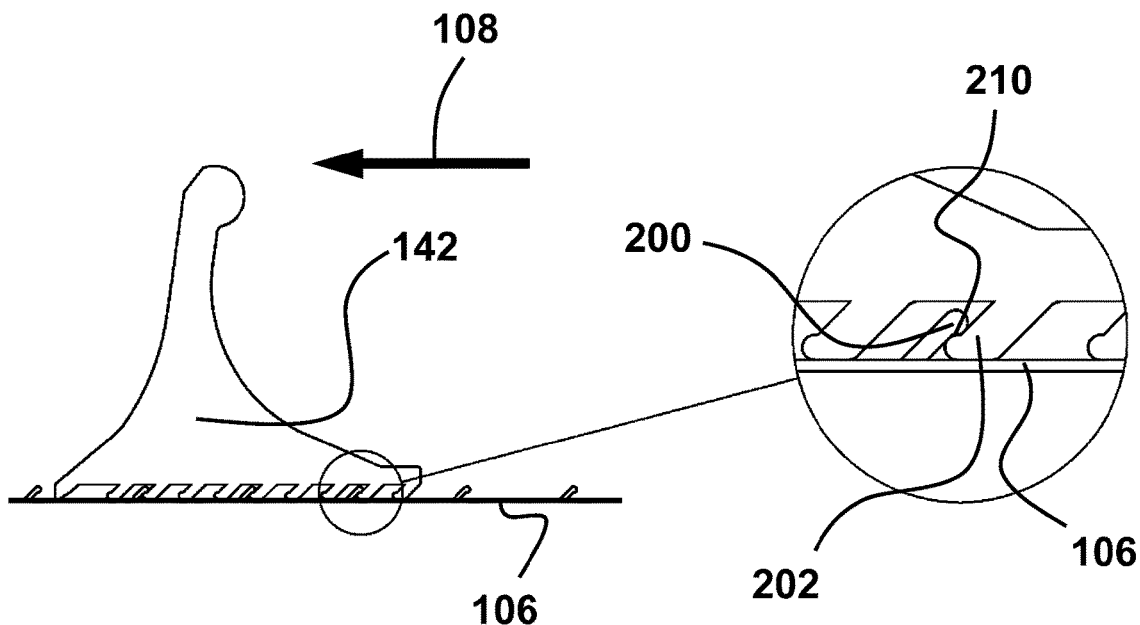
FIG. 27
FIG. 28

WHEEL CHOCK AND METHOD

CROSS REFERENCE TO PRIOR APPLICATIONS

The present case is a continuation of U.S. patent application Ser. No. 17/120,777 filed 14 Dec. 2020, now U.S. Pat. No. 11,479,217, which in turn is a continuation of U.S. patent application Ser. No. 15/167,497 filed 27 May 2016, now U.S. Pat. No. 10,864,895, which in turn is a continuation of PCT Application No. PCT/CA2014/051143 filed 28 Nov. 2014, all of them claiming the benefit of U.S. patent application No. 61/910,264 filed 29 Nov. 2013. The entire contents of these prior cases are hereby incorporated by reference.

TECHNICAL FIELD

The technical field relates generally to wheel chock restraint systems for preventing vehicles from moving away in an unauthorized or accidental manner when they are parked, for instance truck trailers at a loading dock or the like.

BACKGROUND

Wheels chocks are devices that can be positioned immediately in front of a wheel of a parked vehicle to act as an obstacle in the event of an unauthorized or accidental departure. This can happen as a result, for instance, of an error or because someone is trying to steal the vehicle. Many other situations exist, including ones where the vehicle movements are caused by other factors, such as trailer creep where the motion of a lift truck entering and exiting a trailer can cause separation between the trailer and the dock leveler.

While conventional wheel chocks have proven to be very efficient over the years, there are still some situations where someone or something may be able to overcome the presence of a wheel chock, particularly when the vehicle is empty or only lightly loaded and there is a deliberate attempt to move the vehicle by force. For instance, a very determined driver may use a truck tractor to pull an empty or lightly loaded trailer using a very powerful traction force because the driver believes, through error or miscommunication, that the trailer is stuck, or because the driver attempts to steal the trailer. In such an exceptional situation, a conventional wheel chock may become a ramp and the corresponding wheel can eventually roll over it, thereby allowing the trailer to leave. FIGS. 48 to 50 show how this can happen.

FIG. 48 is a semi-schematic side view illustrating an example of a conventional wheel chock 900 at the time of initial contact with an example of a wheel 902 of a vehicle. The wheel 902 includes a rigid rim 904 and a tire 906 mounted around the rim 904, for instance a gas-inflated tire. The only force present in FIG. 48 is the local weight W exerted vertically downwards at the center of this wheel 902. When the vehicle is a truck trailer, the total weight of the empty trailer is often relatively small compared to the total weight when the same trailer is fully loaded. The local weight W is thus assumed to be relatively small for the purpose of this example.

FIG. 49 is a view similar to FIG. 48, but showing the initial local deformation of the circumferentially disposed resilient tire tread 914 of the tire 906 when a moderate horizontal force T is applied. This horizontal force T can be the result of a truck tractor pulling the trailer in the departure direction. The horizontal force T is applied on the wheel 902 at its rotation axis. The conventional wheel chock 900 is anchored to the ground surface 908 or is otherwise prevented from moving in the departure direction. The tire 906 deforms on the contact surface 910 of the conventional wheel chock 900. The contact surface 910 often has a curved-shaped profile that somewhat matches the outer shape of the tire tread 914, as shown.

As the horizontal force T becomes stronger, the radial compression of the tire 906 against the contact surface 910 also increases. Further increasing the horizontal force T creates a significant local radial deformation where the tire tread 914 engages the contact surface 910 and also a deformation at an upper edge 912 of the contact surface 910, namely at the boundary where the tire tread 914 engages the contact surface 910 and the free space immediately above the conventional wheel chock 900. The gas pressure inside the tire 906 causes a local reaction force R at the upper edge 912, which force is resulting from the resilient tire tread 914 of the tire 906 trying to recover its initial circular shape. Reaction forces are also created elsewhere on the contact surface 910 but are not shown for the sake of simplicity. The local reaction force R has a horizontal component that is opposite the horizontal force T and a vertical component that is in the upward direction, thus in a direction that is opposite the weight W. The sum of the various forces, namely the weight W, the horizontal force T, and the reaction forces, including the local reaction force R, leads to a resultant force vector F having a downward angle "a". In FIG. 49, the direction of this resultant force vector F follows a path passing below the upper edge 912 of the contact surface 910.

As can be seen, an increase of the weight W (for instance by increasing the load inside the vehicle) can increase the angle "a" of the resultant force vector F, i.e., the resultant force vector F being pivoted counterclockwise in the example shown in FIG. 49. On the other hand, provided that the weight W remains the same, an increase of the horizontal force T will increase the local reaction force R, including its vertical upward component. The angle "a" of the resultant force vector F will then be pivoted clockwise in the example shown in FIG. 49.

FIG. 50 is also a view similar to FIG. 48, but showing what happens when an even stronger horizontal force T is applied. This horizontal force T is stronger than that of FIG. 49. The tire deformation increased to the point where the vertical component of the local reaction force R became greater than the weight W, thereby creating a lifting force. This lifting force caused the wheel 902 to rise vertically above the ground surface 908 over a distance D in the illustrated example. As the horizontal force T and the vertical component of the local reaction force R increased, the angle "a" of the resultant force vector F decreased as well, to the point where the direction of the resultant force vector F is no longer following a path passing below the upper edge 912. It now passes vertically above, as shown. This is due to the combined effect of the angle "a" of the resultant force vector F being pivoted towards the horizontal and the lifting motion of the wheel 902 over the distance D, which moved the rotation axis of the wheel 902 upwards. The wheel 902 of FIG. 50 is shown as it would appear immediately before rolling over the top of this conventional wheel chock 900.

Increasing the height of conventional wheel chocks is one way of mitigating the risks of a rollover. Having a wheel chock taller than the rotation axis of the wheel will be very efficient against a rollover. However, this is not always a suitable or even possible solution. For instance, an oversized wheel chock will be heavier, difficult to handle due to the added size and weight, and it may not fit in some tight spaces, such as between two successive wheels of a tandem axle arrangement or other multiple axle arrangements. On some vehicles, the intervening space between two successive wheels is the only available space due to obstacles elsewhere created by specific truck chassis designs. This intervening space is often limited, thereby imposing size limitations to wheel chocks. Increasing the size of a wheel chock is thus not always possible.

Another challenge in the design of wheel chocks is to mitigate the likelihood of the wheel chock from becoming stuck under the wheel, such as when the weight of the vehicle increases, while the wheel chock is in position. For instance, when the vehicle is a truck trailer, the significant weight difference between the empty trailer and the fully loaded trailer can cause the contact area between the tire of the wheel and the ground surface to increase, and a portion of the wheel chock close to the wheel can then become stuck underneath the tire. This may require the vehicle to be moved away from the wheel chock, but if the truck trailer cannot be backed up to clear the wheel chock, for instance if the truck trailer is already against the wall at the end of the loading dock, this can prevent the wheel chock from being removed and can require the truck trailer to be unloaded. This situation is highly undesirable since it will create delays and additional work.

One of the most efficient and convenient way of fixing a wheel chock is to use a ground-anchored base plate. The wheel chock and the base plate have corresponding sets of spaced-apart teeth. The base plate allows the position of the wheel chock to be adjusted according to the needs. It is a relatively simple structure that does not create a significant obstacle to movements or to other operations occurring at a loading dock. Structures such as railings or the like that can be installed to support wheel chocks are known to be often expensive and they also act as obstacles. For instance, removing snow or ice when these structures are present is often very difficult.

Base plates create other challenges of their own since some wheel chocks may tip before the actual rollover could occur and this may allow the wheel of a vehicle to roll over the wheel chock even more easily. In other cases, the rollover and the tipping may occur simultaneously. Tipping of the wheel chock occurs when the resultant force applied on the wheel chock by the wheel has an upward component following a path that goes beyond a certain angle. This force component will urge the wheel chock to pivot out of engagement with the base plate. One way to mitigate this phenomenon is to design the wheel chock with a relatively long base so as to bring the pivot point as far as possible from the wheel and/or to increase the size of the intervening teeth between the wheel chock and the base plate. However, increasing the length of the wheel chock is often limited by the lack of available space and by the maximum weight the wheel chock can have. Weight restriction may thus limit its length. Increasing the size of the teeth can also create other issues, such as an increase in the manufacturing costs and/or making the top of the base plate too high compared to the adjacent ground surface.

Designing a relatively small and lightweight wheel chock having a very high rollover resistance and a very high-tipping resistance is not easy. Overall, existing approaches in the design of wheel chocks have many inherent limitations. There is always room for further improvements in this area of technology.

SUMMARY

The proposed concept provides a new approach to increase the efficiency of wheel chocks compared to conventional wheel chock designs. This new approach can result in wheel chocks in which the risks of a rollover and/or tipping are minimized, if not significantly minimized or even alleviated.

In one aspect, there is provided a method for blocking a wheel using a wheel chock placed over a ground-anchored base plate, the wheel chock including a main body having a tire-facing side and a tire deformation cavity provided on the tire-facing side, the wheel including a rigid rim around which is mounted a tire having a circumferentially disposed resilient tire tread, the tire tread having an undeformed state and a substantially circular outer shape when away from the wheel chock, the method including: establishing a latched engagement between the wheel chock and the base plate to set the wheel chock in a tire blocking position, the wheel chock including a tire-engaging bulge located substantially at a top end of the main body and projecting from the tire-facing side immediately above the tire deformation cavity; once the latched engagement is established, bringing the tire tread into direct contact with the tire-engaging budge and pressing the wheel onto the wheel chock to initiate a local radial deformation of the tire tread and bring the tire tread into a deformed state, the tire tread initially engaging the tire-engaging budge at a bulge engagement point; and further pressing the wheel onto the wheel chock to create a sizable disruption in the circular outer shape and receiving a portion of the deformed tire tread into the tire deformation cavity provided under the tire-engaging budge, the wheel exerting a horizontal force that is combined with a vertical local weight force acting on the wheel to create a resultant force vector at a center of the wheel, the wheel chock being configured and disposed to help maintain the resultant force vector in a path passing below the top end of the main body so as to substantially prevent the wheel from moving upwards relative to the wheel chock and ultimately rolling over the wheel chock.

More details on the numerous aspects, features and advantages of the proposed concept can be found in the following detailed description and the appended figures.

BRIEF DESCRIPTION OF THE FIGURES

FIGS. 9 to 28 show examples of some of the anchoring arrangements that could be used between the wheel chock and the corresponding base plate;

DETAILED DESCRIPTION

Figure 1:
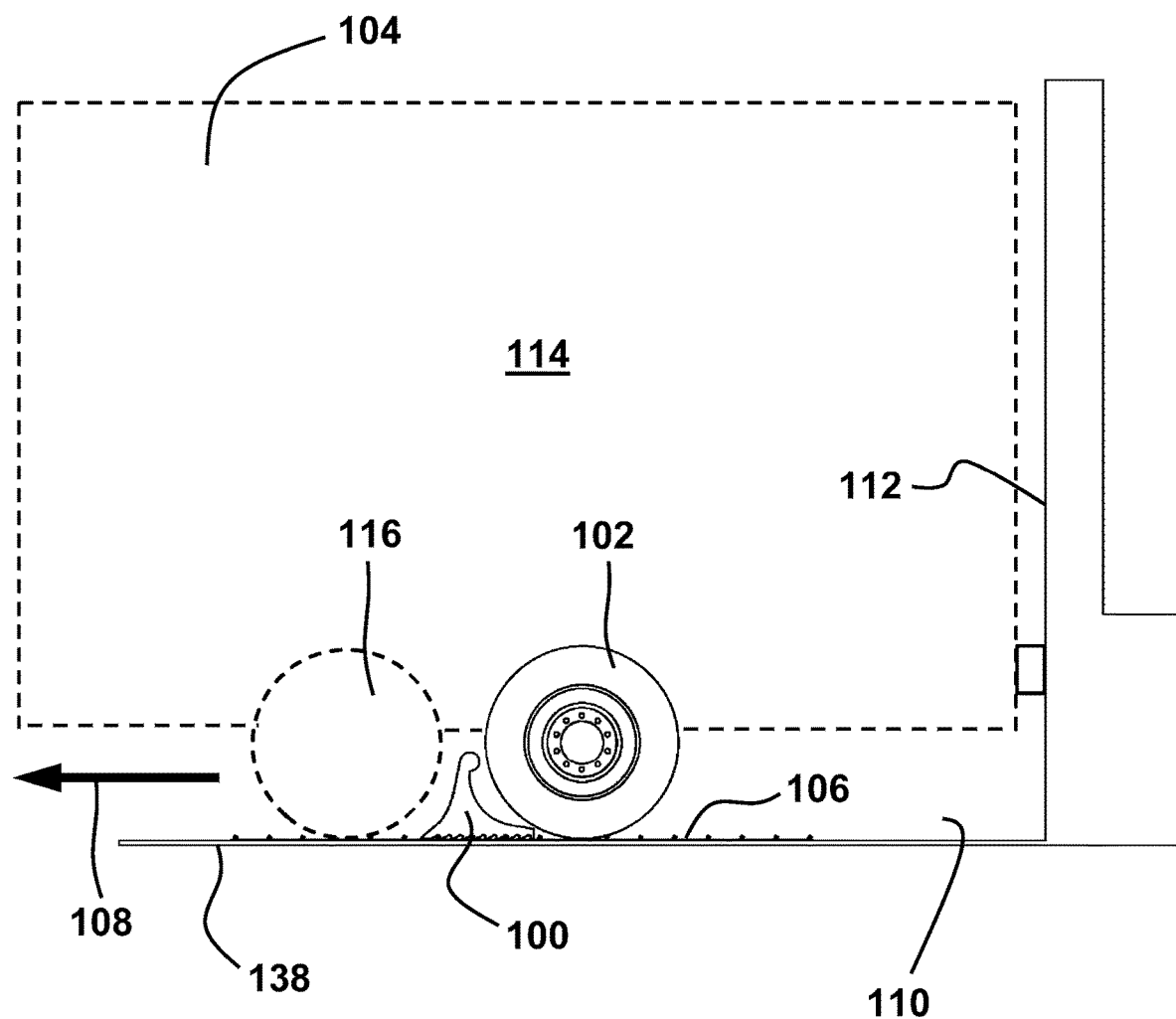
FIG. 1 is a semi-schematic side view of an example of a wheel chock in accordance with the proposed concept, the wheel chock being in position in front of an example of a wheel of a generic vehicle.

FIG. 1 is a semi-schematic side view of an example of a wheel chock 100 in accordance with the proposed concept. The wheel chock 100 is in position immediately in front of a wheel 102 of a generic vehicle, in this case a truck trailer 104. This is only one among a multitude of possible uses for the wheel chock 100.

The trailer 104 is designed to be hauled by a truck tractor and is schematically illustrated in FIG. 1. The wheel chock 100 is part of a restraint system for preventing the trailer 104 from moving away in an unauthorized or accidental manner. The wheel chock 100 is designed to be positioned directly in front of the wheel 102 over a corresponding ground-anchored serrated base plate 106. The wheel chock 100 is in a tire-blocking position in FIG. 1. The base plate 106 itself is rigidly anchored to the ground, for instance using bolts or any other suitable arrangement.

The wheel chock 100 creates an obstacle that must be removed at the appropriate moment, for instance by the driver of the truck tractor, when the trailer 104 is ready and authorized to leave. The wheel chock 100 is otherwise left in position to block the wheel 102, thereby blocking the whole trailer 104. The wheel chock 100 can be connected to an articulated spring-assisted arm in some implementations of the restraint system. In others, it can simply be moved by hand, for instance with a handle or the like. Other arrangements and configurations are possible as well.

In FIG. 1, the underside of the wheel chock 100 includes a plurality of teeth engaging corresponding teeth provided on the base plate 106. They configured and disposed to hold the wheel chock 100 in a direction of departure 108. At least one of the teeth under the wheel chock 100 must engage one tooth on the base plate 106. Nevertheless, there are more teeth under the wheel chock 100 than the number of teeth on the base plate 106 for the same length in the illustrated restraint system, and the spacing between the teeth is designed so that the wheel chock 100 can fit at any position along the base plate 106. This yields a greater flexibility in the adjustment of the positioning of the wheel chock 100 with reference to the wheel 102. Other configurations and arrangements are possible. For instance, while it may be desirable to have a restraint system where the wheel chock 100 can fit at any position along the base plate 106, it is still possible to design the restraint system differently in some implementations. Other variants are possible as well.

The wheel chock 100 has an overall wheel chock height and an overall wheel chock length. The chock length is the horizontal dimension in the longitudinal direction, thus in a direction that is parallel to the departure direction 108.

The trailer 104 in the example of FIG. 1 is shown as being parked at a loading dock 110 and the back of the trailer 104 is close to a wall 112 located at the bottom end of the loading dock 110. It can rest against a cushion or the like, as shown schematically in FIG. 1. The wall 112 can be part of a commercial building, for instance a warehouse, a distribution center, or the like. Variants are possible as well. The trailer 104 includes a cargo compartment 114. Access into the cargo compartment 114 can be made for instance using a rear door on the trailer 104, which rear door is positioned in registry with a corresponding door on the wall 112. The floor of the cargo compartment 114 and the floor of the corresponding door are generally at the same height or at a similar height so that a lift truck or the like can load or unload the cargo therein. A ramp can be provided between both floors. Other variants are also possible.

It should be noted that the proposed concept can be implemented on wheel chocks used for vehicles that are not truck trailers, including vehicles unrelated to the transport industry. Likewise, loading docks are not the only locations where these wheel chocks can be provided. For instance, wheel chocks can be used with vehicles located in parking areas, truck stops, warehouses, distribution centers, etc.

Still, the departure direction 108 in the figures may not always be the forward direction for all vehicles since some wheel chocks will need to be positioned behind a wheel instead of being positioned in front of it. Nevertheless, only for the sake of simplicity, the following detailed description will generally refer to the vehicle as being the trailer 104 at the loading dock 110, which trailer 104 has a forward departure direction 108.

In the example illustrated in FIG. 1, the wheel chock 100 is shown as being positioned between the wheel 102 and an adjacent wheel 116 located immediately in front of the wheel 102. The wheel 102 and the adjacent wheel 116 are part of a tandem axle arrangement. Other kinds of arrangements and configurations are possible as well.

Many truck trailers have a dual wheel arrangement where two wheels positioned side-by-side at each end of each axle. In this case, the word "wheel" used in the context of the wheel chock 100 refers to the exterior wheel and/or the interior wheel. Most implementations will have the wheel chock 100 in position with only one of the wheels at a time, often the exterior wheel because of its proximity to the side of the vehicle. However, it may be possible to position the wheel chock 100 simultaneously in front of the two side-by-side wheels in some situations or even only in front of the interior wheel in others. It is thus intended that the word "wheel" in a singular form means either only one of the side-by-side wheels or both side-by-side wheels simultaneously in the context of a dual wheel arrangement.

Figure 2:
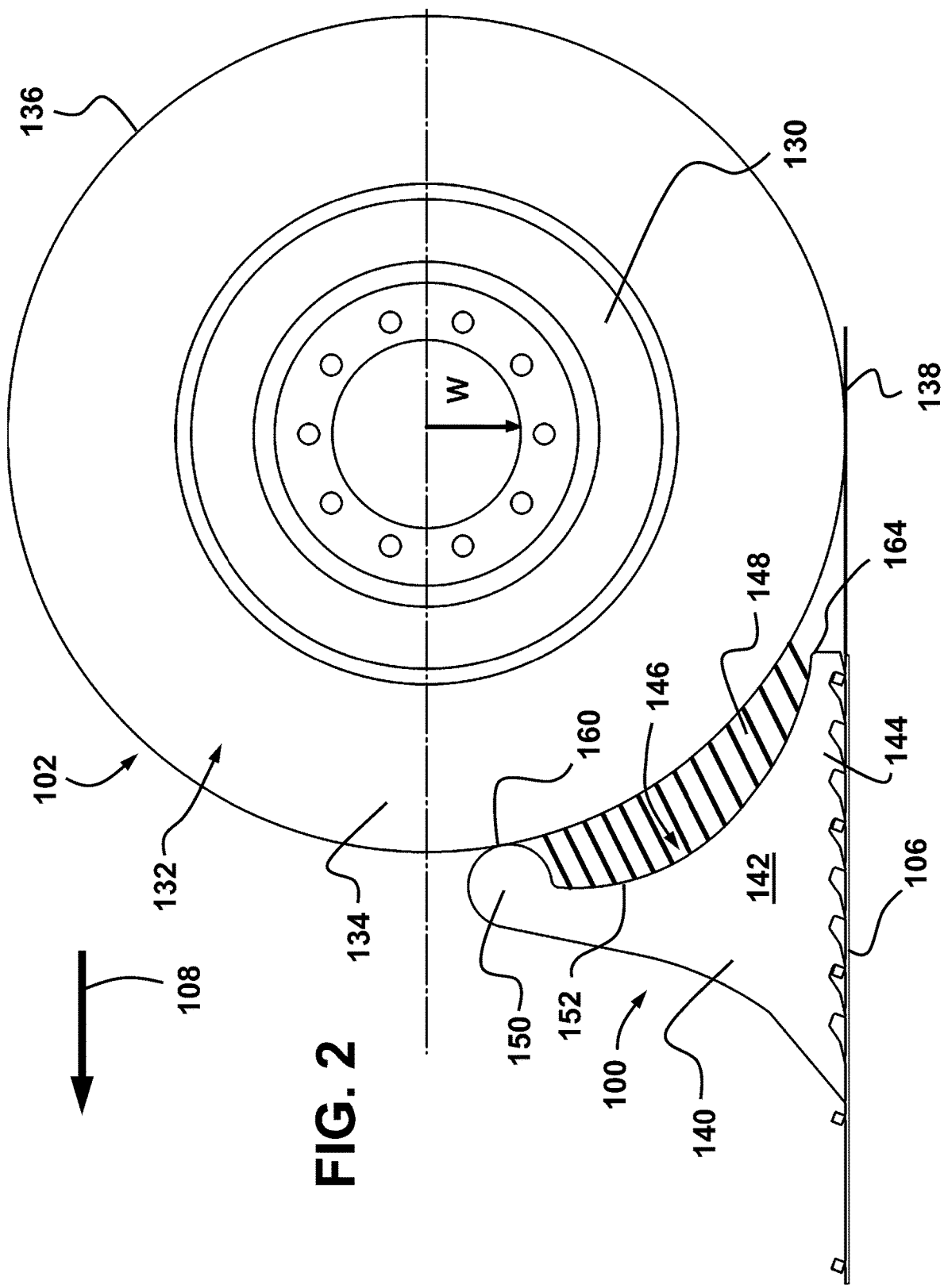
FIG. 2 is an enlarged semi-schematic side view of the wheel chock of FIG. 1 and its corresponding wheel at the time of their initial contact.

FIG. 2 is an enlarged semi-schematic side view of the wheel chock 100 shown in FIG. 1 and its corresponding wheel 102 at the time of their initial contact.

As can be seen, the wheel 102 includes a rigid rim 130 and a tire 132 that is mounted around the rim 130. The rim 130 is bolted or otherwise removably attached to a rotating element mounted to a corresponding axle of the trailer 104. The tire 132 is made of an elastic material, for instance a material including rubber or the like. The illustrated tire 132 is a gas-inflated pneumatic tire filled with gas under pressure, for instance pressurized air. Pneumatic tires for truck trailers are often pressurized at about 100 psi. Variants are also possible. For instance, the tire 132 could be constructed without having a gas-inflated interior.

The tire 132 includes two opposite sidewalls 134, one being on the exterior side and the other on the interior side, and a circumferentially disposed resilient tire tread 136. The tire tread 136 is the main portion of the tire 132 engaging the ground surface 138. The sidewalls 134 have a sidewall height, which can be defined as the radial distance between the outer edge of the rim 130 and the outer surface of the tire tread 136. The radius of the wheel 102, namely the distance between the rotation axis 120 at the center of the wheel 102 and the outer surface of the tire tread 136, is hereby referred to as the center height.

It should be noted at this point that the upper surface of the base plate 106 is considered to be the ground surface 138 since the wheel chock 100 and the wheel 102 will be over it. FIG. 2 shows the wheel 102 not being on the base plate 106 but the wheel 102 can also be right over the base plate 106 in some circumstances.

When the wheel 102 is installed in a working position on the trailer 104 and the trailer 104 is loaded, even with only the mass of the trailer 104 when the cargo compartment 114 is empty, the circular shape of the tire tread 136 is normally disrupted at the bottom by a relatively flat contact area created between the tire tread 136 and the ground surface 138. The dimensions of the wheel 102 can thus vary depending on where the measurements are made when such load-induced tire deflection is present. The tire tread 136 is also subjected to wear and becomes progressively thinner over time. In the present description, the sidewall height and the center height generally refer to the original dimensions of an unloaded wheel 102. If the tire 132 is a gas-inflated tire, the pressure is assumed to be the adequate pressure in actual use. The sidewall height and the center height are considered to be substantially the same all around the wheel 102 when the wheel 102 is unloaded, for instance when the wheel 102 is detached from the trailer 104 and set horizontally on the ground surface 138.

In the example depicted in FIG. 2, the only significant force present is the local weight W caused by the mass of the load above the wheel axle and that is supported by the wheel 102 in front of which the wheel chock 100 is installed. The tire tread 136 is said to be in an undeformed state in FIG. 2. The load-induced tire deflection at the bottom is not considered since it is a normal phenomenon. The tire tread 136 is in an undeformed state in FIG. 2.

The wheel chock 100 includes a main body 140. The main body 140 is the supporting structure or frame capable of resisting the force applied on the wheel chock 100 by the wheel 102. The main body 140 of the wheel chock 100 can have a monolithic construction, and it can be entirely made of a rigid material, for instance a metal such as steel. Nevertheless, variants are possible as well.

Here, the expression "monolithic construction" means that there are no moving or easily detachable part once assembled and ready to be used. All parts of the main body 140 are rigidly connected together, and it is not a foldable construction in normal operation. Otherwise, additional parts can be added to the main body 140, if desired, but the basic functions of the main body 140 do not require any movable parts if it has a monolithic construction. The advantages of a monolithic construction include the simplicity of use and the increased resistance due to the absence of hinges or the like, particularly where the maximum stresses occur. Variants are possible as well.

In the illustrated example, the main body 140 of the wheel chock 100 includes two spaced-apart main side members 142. The side members 142 can be in the form of plates, but variants are also possible. They can be rigidly connected together using transversal members, for instance a plurality of transversal members that are welded or otherwise rigidly connected to the interior faces of the side members 142.

The wheel chock 100 has a bottom base portion 144 where teeth 202 are located.

The wheel chock 100 includes a tire-facing side 146. As its name suggests, the tire-facing side 146 is the side that is adjacent to the tire tread 136 when the wheel chock 100 is in position in front of the wheel 102. However, unlike conventional wheel chocks, the tire-facing side 146 of the wheel chock 100 is greatly recessed so as to create a tire deformation cavity 148 located immediately below a tire-engaging bulge 150. The tire-engaging bulge 150 is located on the tire-facing side 146. The tire deformation cavity 148 is shown by the hashed lines in FIG. 2.

The tire-engaging bulge 150 is located at a top end of the wheel chock 100. It projects outwardly to create the part against which the tire tread 136 will exert most of its pressing force against the wheel chock 100.

The tire-engaging bulge 150 has a non-puncturing shape to prevent the tire tread 136 from being punctured or otherwise damaged. The tire-engaging bulge 150 can be in the form of a smooth and continuous rounded convex surface extending transversally. Variants are also possible. For instance, the tire-engaging bulge 150 can be more or less triangular in profile, with a rounded tip.

Many other shapes are possible. When viewed from the side, the tire-engaging bulge 150 has a profile including a top surface portion and a bottom surface portion. The approximate medial line at the boundary between these top and bottom surface portions engages the tire tread 136 at what is referred to hereafter as the bulge engagement point 160.

The tire deformation cavity 148 defines a recessed tire-facing surface 152 that is spaced apart from the tire tread 136 when the tire tread 136 initially contacts the tire-engaging bulge 150 in an undeformed state. In the illustrated example, the recessed tire-facing surface 152 is provided by the parallel edges of the side members 142. These two side members 142 are spaced apart from one another in this implementation. The space between the interior faces of the side members 142 can be left open, for instance to save weight, but the edges must then have a minimum width. The edges could otherwise act as blades and damage the tire tread 136 to prevent them from acting as blade edges that can puncture or otherwise rupture the tire tread 136 under an intense pressing force. If required, a ledge or a similar feature can be added to locally increase the width of each edge. Variants are possible as well.

As aforesaid, the hashed area in FIG. 2 represents the tire deformation cavity 148, namely the volume available for a potential tire deformation when the wheel 102 is subjected to a horizontal force. The main purpose of the tire deformation cavity 148 is to capture as much volume as possible of the tire tread 136 on the bottom surface portion of the tire-engaging bulge 150 when the tire tread 136 is subjected to a deformation created by a horizontal force T. This horizontal force T can be the result, for instance, of a truck tractor pulling the trailer 104 in a departure direction 108. The horizontal force T is applied at the rotation axis 120 of the wheel 102.

Figure 3:
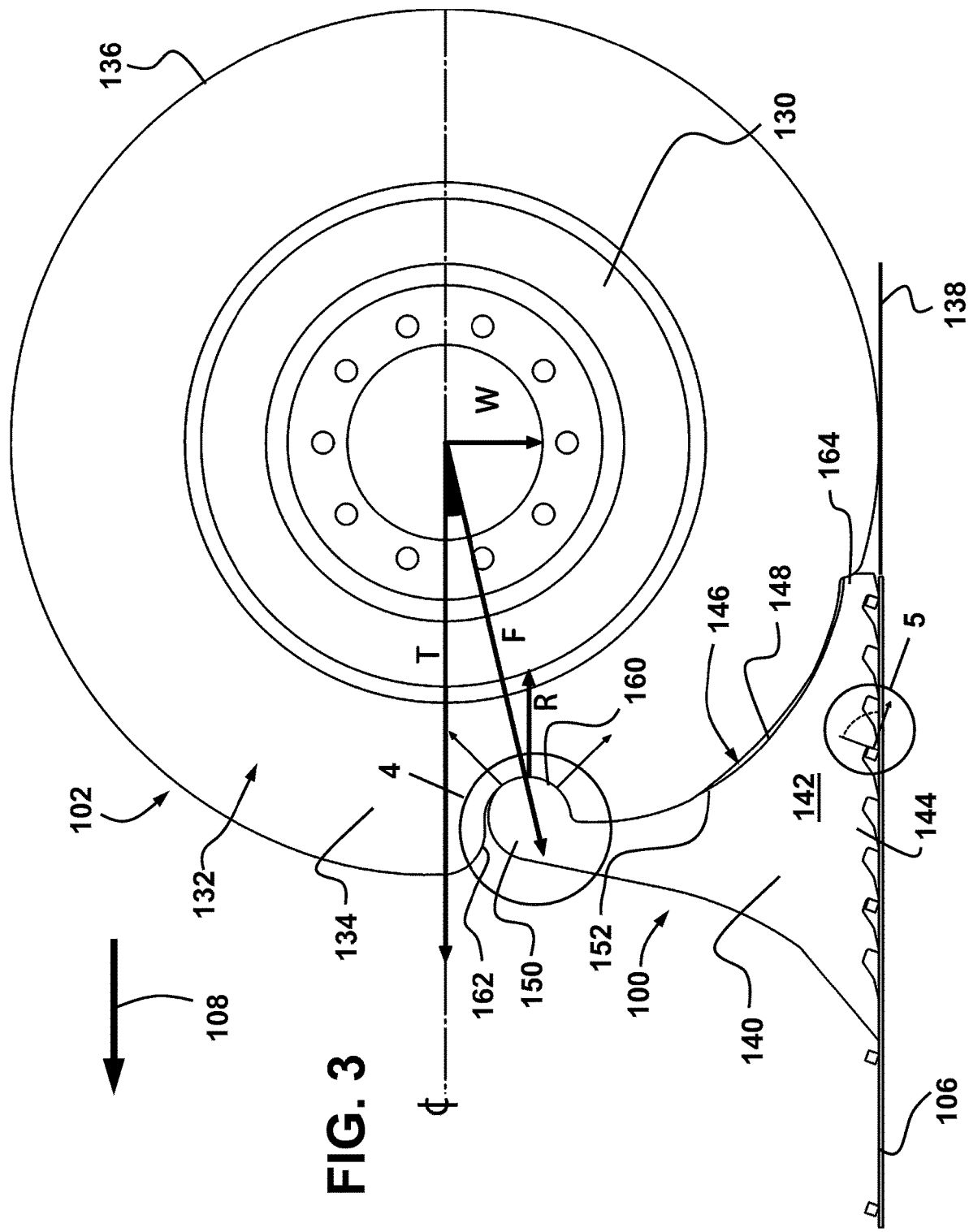
FIG. 3 is a view similar to FIG. 2 but showing an example of the local deformation of the tire tread caused by the wheel being driven against the wheel chock using a strong horizontal force.

FIG. 3 is a view similar to FIG. 2 but showing an example of the local deformation 162 on the tire tread 136 caused by the wheel 102 being driven against the tire-engaging bulge 150 of the wheel chock 100 using a strong horizontal force T. Since the wheel chock 100 is attached to the base plate 106, it will not move in the departure direction 108 when pushed by the wheel 102 due to the horizontal force T. As can be seen, the horizontal force T causes a disruption in the normal circular shape of the tire tread 136. The tire tread 136 presses mostly against the tire-engaging bulge 150 of the wheel chock 100. The tire 132 and its tire tread 136 are in a very deformed state in FIG. 3. The deformed state started as soon as the horizontal force T created a sizable disruption in the circular outer shape.

Figure 4:
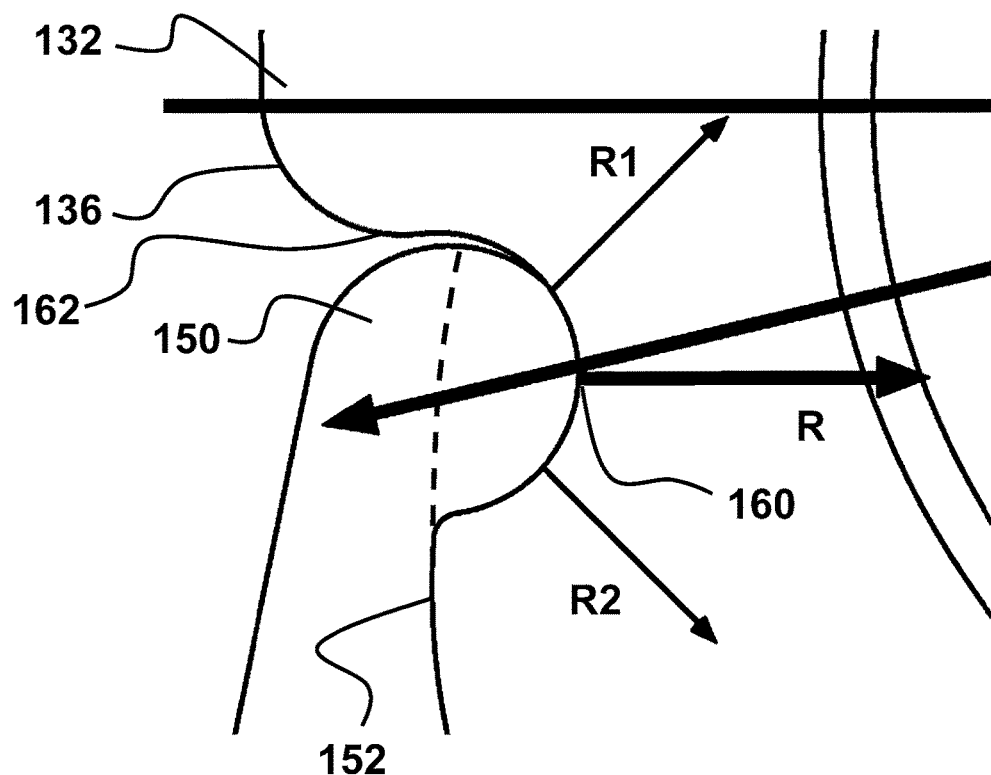
FIG. 4 is an enlarged view of the top area identified in FIG. 3.

FIG. 4 is an enlarged view of the top area identified in FIG. 3. As can be seen in FIGS. 3 and 4, the tire tread 136 deforms around the tire-engaging bulge 150 and the pressure causes a local reaction force R from the tire tread 136 trying to recover its initial circular shape. However, two separate forces R1 and R2 are created around the tire-engaging bulge 150 since the tire tread 136 has space available both above and under the tire-engaging bulge 150. Although some of the tire tread 136 now engages the recessed tire-facing surface 152 under the tire-engaging bulge 150 in the example depicted in FIG. 3, most of the force opposing the horizontal force T is applied at the tire-engaging bulge 150.

The local reaction force R is shown in FIG. 3 only for the sake of illustration. The concept is that the upper surface portion and the bottom surface portion of the tire-engaging bulge 150 cause the local reaction force R to be substantially horizontal or very close to it. The local reaction force R essentially works against the horizontal force T, thus increasing the angle "a" of the resultant force vector F and helping the wheel 102 to be kept in place over the wheel chock 100 since the path of the resultant force vector F will remain below the top of the wheel chock 100.

Ideally, the tire-engaging bulge 150 should be as close as possible to the rotation axis 120 of the wheel 102. Placing it above it could even lower or eliminate the upward lifting force component that can potentially lift the wheel 102 above the ground surface 138. However, height and/or weight restrictions often make this impossible and, in many implementations, the tire-engaging bulge 150 will engage the tire tread 136 vertically below the rotation axis 120.

The weight W of the trailer 104 is also a factor that helps keep the wheel 102 on the ground surface 138. A heavier trailer 104 will be more difficult to lift. On the other hand, an empty trailer 104, or a trailer 104 with a light-weight cargo, is more difficult to retain using a conventional wheel chock.

When designing the wheel chock 100, a proper balance must be found between various parameters such as the size limitations (for instance the available space between adjacent wheels, the presence of obstacles, etc.), the maximum chock weight beyond which the wheel chock 100 will be considered too heavy to be handled by most operators, the material strength, the wheel diameter, the tire pressure, and the various forces involved, such as the minimum local weight W and the maximum horizontal force T exerted by or on the wheel 102. Truck tractors with large engines can generate a very considerable torque and the horizontal force T can be significant when the traction conditions are optimal.

The tire tread 136 also has a maximum stress limit that it can withstand prior to a tire failure, for instance a blowout due to at least one of the inner sides of the tire 132 detaching at some point from the outer perimeter of the rim 130. However, in general, most tires should withstand stresses that are less than the maximum horizontal force T developed by most vehicles. The design of the wheel chock 100 can then use the maximum stress of a tire, possibly with a safety factor, as the maximum horizontal force T beyond which the wheel 102 could, in theory, roll over the wheel chock 100 when proper traction conditions are present. These design parameters would assume that either the horizontal force T cannot be high enough to overcome the wheel chock 100 or either that the tire 132 will fail if the horizontal force T does reach that magnitude. Although exceptions exist, most thieves may not be tempted by the prospect of having to drive or haul a vehicle such as the trailer with a damaged tire because this situation can attract attention and it can also significantly impair the vehicle's drivability.

The tire deformation cavity 148 preferably has a depth that is at least about 30% of the sidewall height at the deepest location of the tire deformation cavity 148. This was found to be adequate for many implementations. Variants are possible as well. This depth is measured when the tire tread 136 engages the tire-engaging bulge 150 in an undeformed state, as in FIG. 2. The distance is taken from the outer surface of the tire tread 136 to the recessed tire-facing surface 152.

As best shown in FIG. 4, the bottom surface portion of the tire-engaging bulge 150 merge with the top edge of the recessed tire-facing surface 152 and the tire-engaging bulge 150 projects outwards beyond the projection of the recessed tire-facing surface 152, which projection in depicted with stippled lines. Also, in the illustrated example, the recessed tire-facing surface 152 has a curved shape, at least in its upper half, where it is curved with a minimum radius that is at least half of the wheel diameter. This helps in providing the space for the tire-engaging bulge 150 to go deep within the tire tread 136 when subjected to a very intense force.

In the example illustrated in FIGS. 1 to 3, the wheel chock 100 can include a bottom tire-engaging point 164 over which the bottom part of the tire tread 136 can be positioned when the tire tread 136 forcefully engages the tire-engaging bulge 150. The bottom tire-engaging point 164 is located below the tire deformation cavity 148. While it is still possible to design the wheel chock 100 differently, it is generally desirable that the tire tread 136 engages the bottom tire-engaging point 164 only after the tire tread 136 made the initial contact with the tire-engaging bulge 150. This can mitigate or even alleviate the risks of the wheel chock 100 being wedged under the wheel 102, for instance due to a significant increase of the weight W. The progressive deformation of the tire 132 due to the added weight can trap (or wedge) the wheel chock 100 and prevent it from being easily removed when needed. Nevertheless, the weight W can be useful to force the wheel chock 100 into an engagement with a base plate 106 covered by a layer of snow, ice or even dirt. The bottom tire-engaging point 164 can also be set at a minimal height from the ground surface 138 and this can also help in preventing the wheel chock 100 from being stuck.

Figure 5:
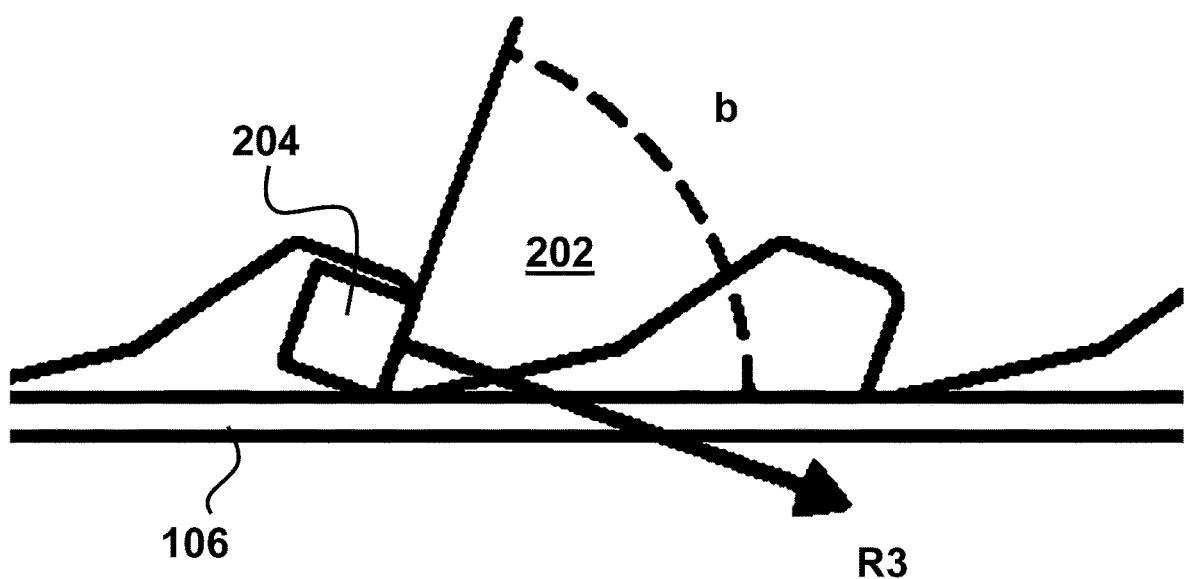
FIG. 5 is an enlarged view of the bottom area identified in FIG. 3.

FIG. 5 is an enlarged view of the bottom area in FIG. 3. It shows that a local reaction force (R3) is also produced at the interface between a tooth 202 of the wheel chock 100 and the corresponding tooth 204 of the base plate 106. The chock tooth 202 and the base plate tooth 204 in this example have mating surfaces positioned at an equal angle (b) from the horizontal. The larger this angle (b) is, the more horizontal the local reaction force (R3) will be, and thus, the local reaction force R at the tire-engaging bulge 150 will eventually lead to the wheel chock 100 coming off the base plate 106, forcing the wheel chock 100 to pivot about its front lower edge. Designing the mating surfaces between the teeth 202, 204 where these mating surfaces have an angle (b) of 90 degrees and over, with reference to the horizontal, will obviously no help in keeping the wheel chock 100 properly anchored. The angle (b) has to be smaller in this case. Having a very small angle (b) would be ideal, but the lack of material available at the end of the chock teeth 202 and/or the increased height of the base plate 106 to accommodate such configuration, could cause other undesirable difficulties and challenges.

Figure 6:
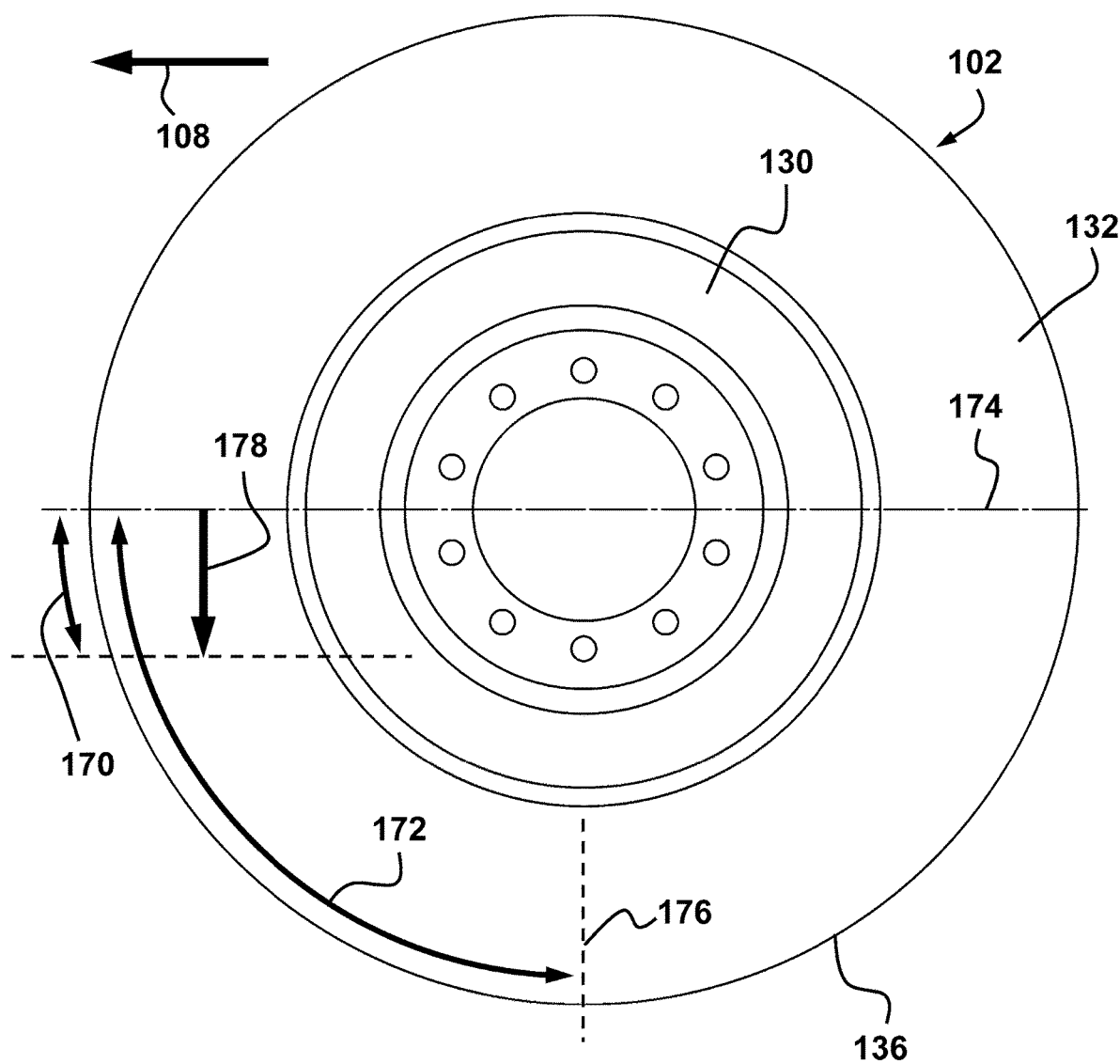
FIG. 6 is a semi-schematic side view of the wheel in FIG. 3, the wheel being shown alone.

FIG. 6 is a semi-schematic side view of the wheel 102 alone. FIG. 6 schematically depicts an upper portion 170 of the lower leading quadrant 172 of the wheel 102. The lower leading quadrant 172 is the region on the tire tread 136 that is towards the departure direction 108 and between the horizontal centerline 174 of the wheel 102 and the vertical centerline 176 of the wheel 102. The upper portion 170 is where the bulge engagement point 160 will be located. Having the bulge engagement point 160 as close as possible to the horizontal wheel centerline 174 increases efficiency. Nevertheless, excellent performance results can still be obtained if the budge engagement point 160 will be lower within the upper portion 170 of the lower leading quadrant 172. In general, the upper portion 170 should have a lower boundary that is located at a vertical distance 178 under the horizontal wheel centerline 174 of about 15% of the wheel diameter. Some implementations of the wheel chock 100 could still yield with good results even if the bulge engagement point 160 is actually lower. However, the efficiency is better in the upper portion 170 for the vast majority of implementations since the force vectors are better positioned.

Figure 7:
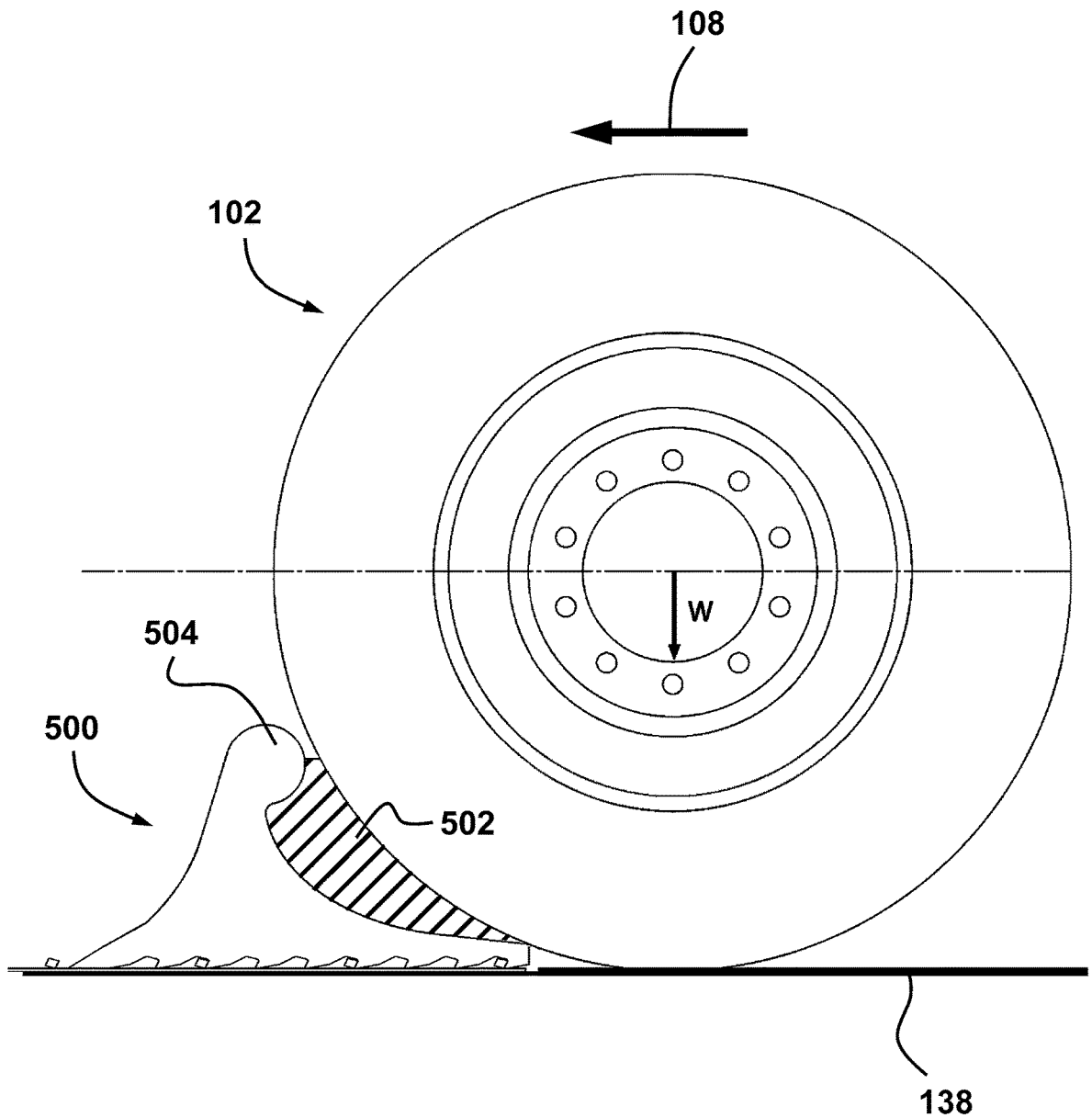
FIG. 7 is a semi-schematic side view of an example of a wheel chock, at the time of initial contact with the wheel, the wheel chock, however, being relatively too small in height with reference to the size of the wheel.

FIG. 7 is a semi-schematic side view of an example of a wheel chock 500, at the time of initial contact. This wheel chock 500, however, is relatively too small in height with reference to the size of the wheel 102. In other words, the wheel chock 500 does not have the proper size. The shape of the wheel chock 500 is otherwise substantially similar to that of the wheel chock 100 of FIG. 1. The wheel chock 500 has a tire deformation zone 502.

Figure 8:
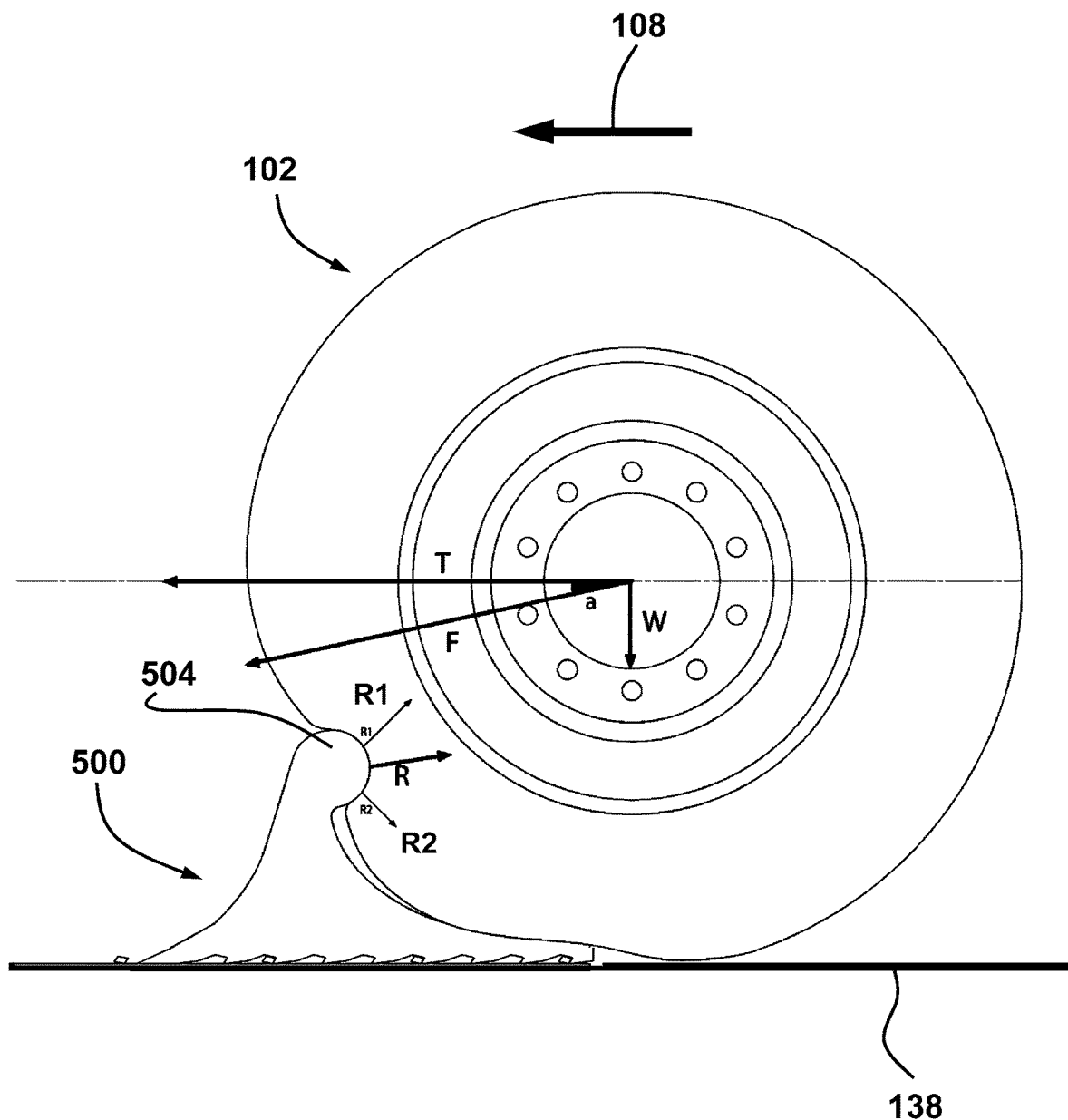
FIG. 8 is a view similar to FIG. 7, but showing an example of the local deformation of the tire tread when a strong horizontal force T is applied, and the smaller wheel chock of FIG. 7 is used.
Figure 29:
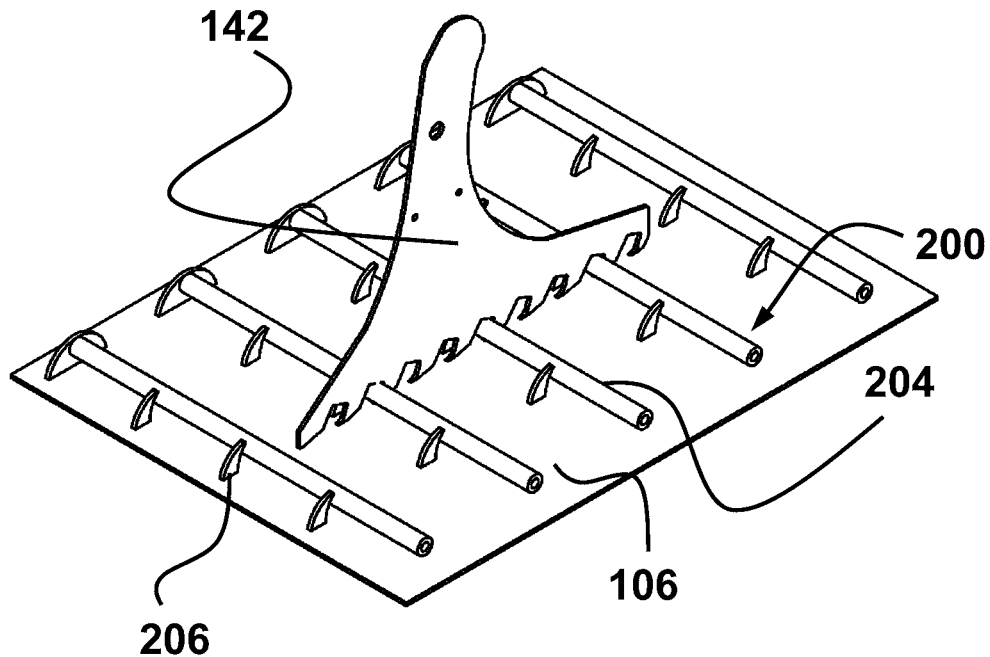
FIGS. 29 to 32 show another example of an anchoring arrangement, but where the teeth of the base plate include transversally extending and spaced-apart rods supported by brackets.

FIG. 8 is a view similar to FIG. 7 but showing an example of the local deformation on the tire tread 136 when a strong horizontal force T is applied and the smaller wheel chock 500 of FIG. 7 is used. FIG. 8 depicts the limitations in chock height. In this case, the local reaction force R is more upward acting because of an imbalance between tire deformation above and below the tire-engaging bulge 504 (R2 being smaller than R1). Thus, the local reaction force R has a smaller impact on the resultant force vector F and the angle "a", and in this case, the horizontal force T will more easily cause the wheel to overcome the wheel chock height, particularly if the weight W is relatively small.

FIGS. 9 to 28 show examples of some of the anchoring arrangements that can be used between the wheel chock 100 and the corresponding base plate 106.

FIGS. 9 to 16 are two examples of existing anchoring arrangements having teeth 202 on the wheel chock 100 and teeth 204 on the base plate 106. The teeth 204 can be welded or otherwise rigidly attached to the upper surface of the base plate 106.

FIGS. 17 to 20 show an example of a novel anchoring arrangement where the teeth 202, 204 create a positive latched engagement when the wheel chock 100 is in position since both share a common horizontally extending surface.

FIG. 17 only illustrates one of the side members 142 of the wheel chock 100. FIG. 18 is an enlarged view of an area shown in FIG. 17. FIG. 19 is a side view of the base plate 106 and of the side member 142 shown in FIG. 17. FIG. 20 is an enlarged view of an area identified in FIG. 19. As can be seen, the teeth 204 of the base plate 106 have an inverted L-shaped cross section and the side member 142 also have teeth 204 with an L-shaped cross-section, one side, however, being sloped. The teeth 202 and the teeth 204 meet on the side opposite to the departure direction 108. This arrangement helps mitigate the risks of the teeth 202, 204 being disconnected if the wheel 102 does have an upward lifting motion, for instance after repeated attempts by the driver to pull the trailer 104 with force. In some circumstances, the magnitude and the direction of the forces exerted by the tire tread 136 on the top end of the wheel chock 100 could potentially cause the teeth 202 from detaching from the teeth 204 of the base plate 106. The illustrated arrangement helps prevent the wheel chock 100 from tipping, especially in a situation where a major pulling force is utilized to move the trailer 104 and the trailer 104 is empty or only lightly loaded.

FIGS. 21 to 28 show two other examples of novel anchoring arrangements including teeth 202 and corresponding teeth 204. These anchoring arrangements also feature a horizontally extending surface.

FIGS. 29 to 32 show another example of an anchoring arrangement but where the teeth 204 of the base plate 106 include transversally extending and spaced-apart rods supported by brackets 206. Each tooth 204 is supported above the upper surface of the base plate 106 by a plurality of brackets 206. The teeth 202 underneath the wheel chock 100 will engage some of the teeth 204. The teeth 202 of this wheel chock 100 are slanted and include sharp tips. The sharp tips can be useful in cold weather conditions if the base plate 106 has some ice or snow thereon.

Figure 30:
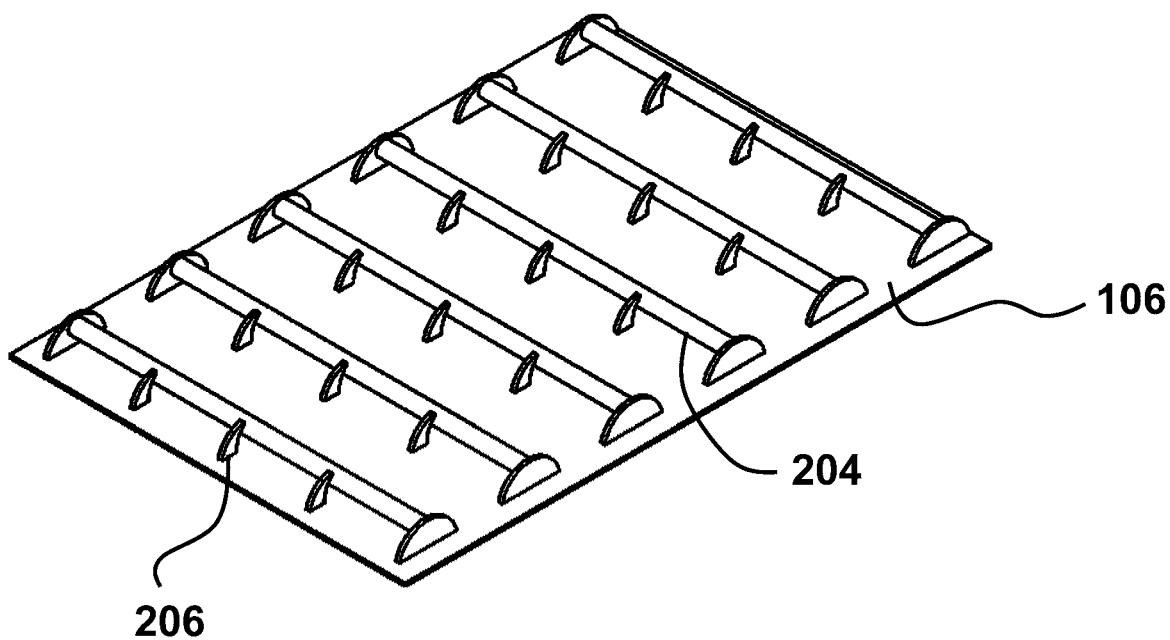
Figure 31:
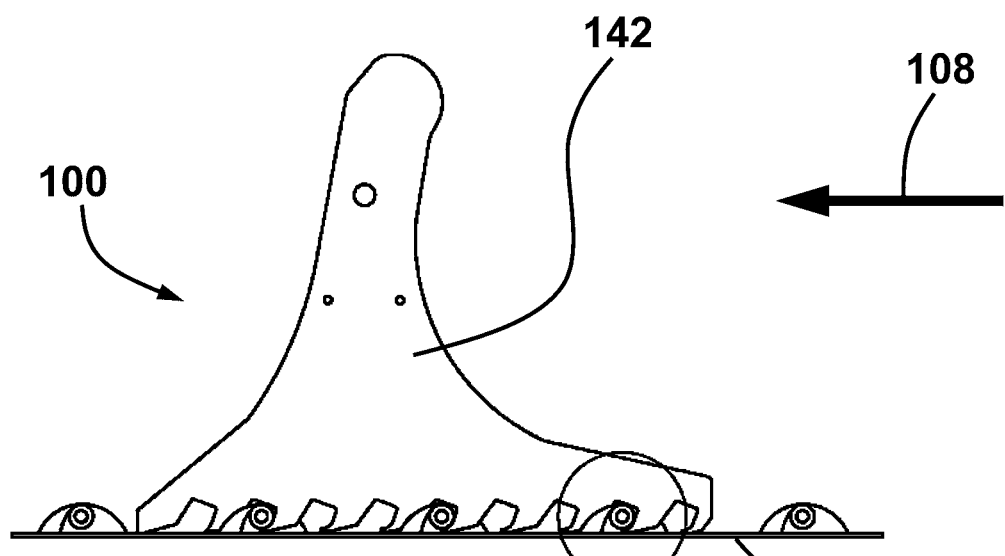
Figure 32:
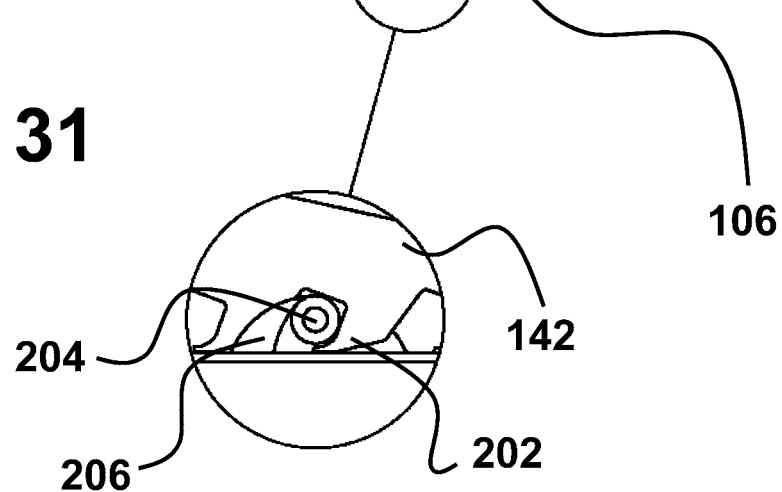

FIG. 30 shows only the base plate 106. The teeth 202 are designed to fit under the bottom of the teeth 204 when the wheel chock 100 is in a tire-blocking position. This will increase the resistance against an upward motion since the teeth 202 engage a large proportion of the circumference of the teeth 204.

Figure 33:
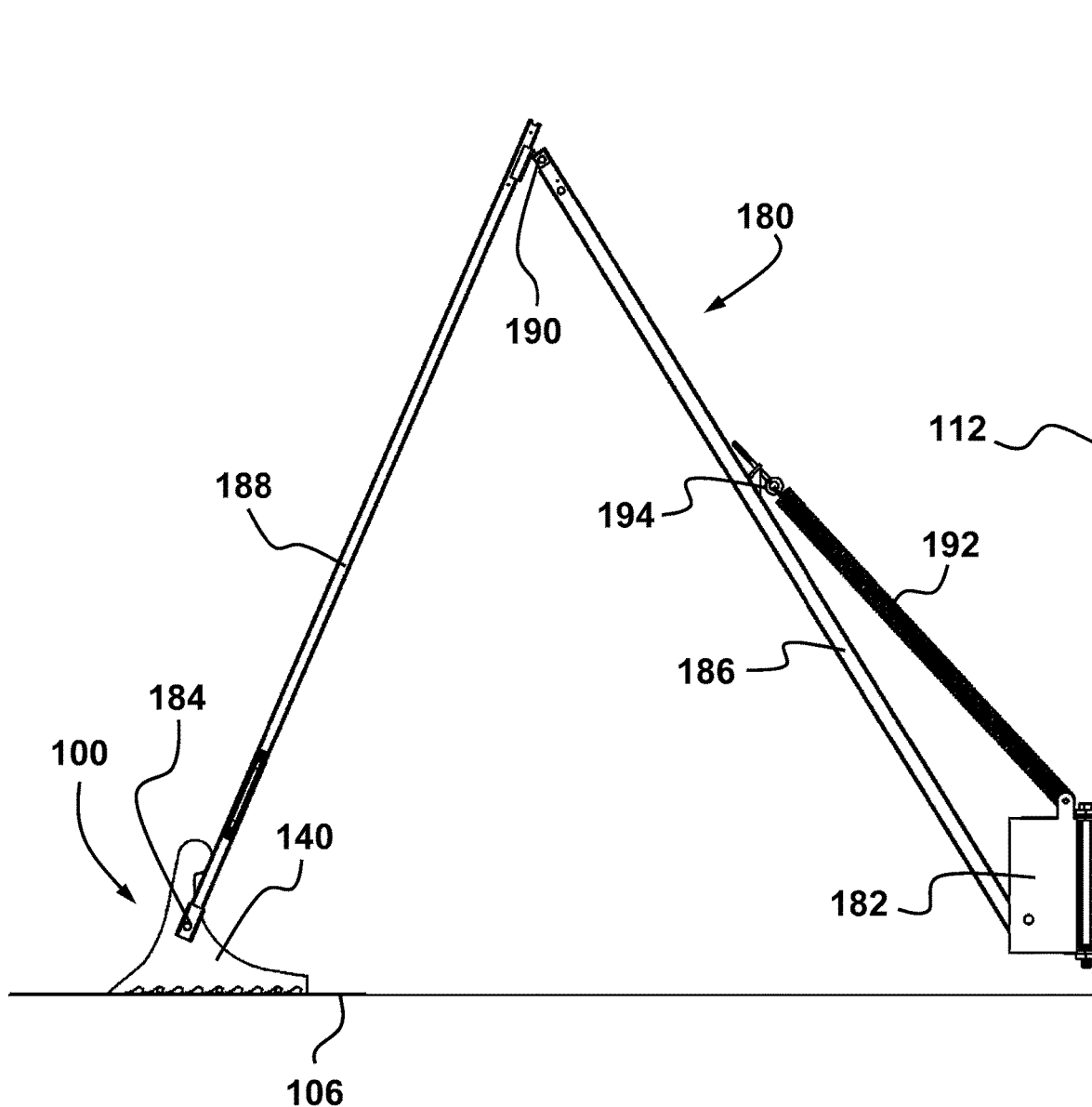
FIGS. 33 to 35 show examples of some of the features that can be used to help an operator in positioning the wheel chock on or off the base plate.
Figure 34:
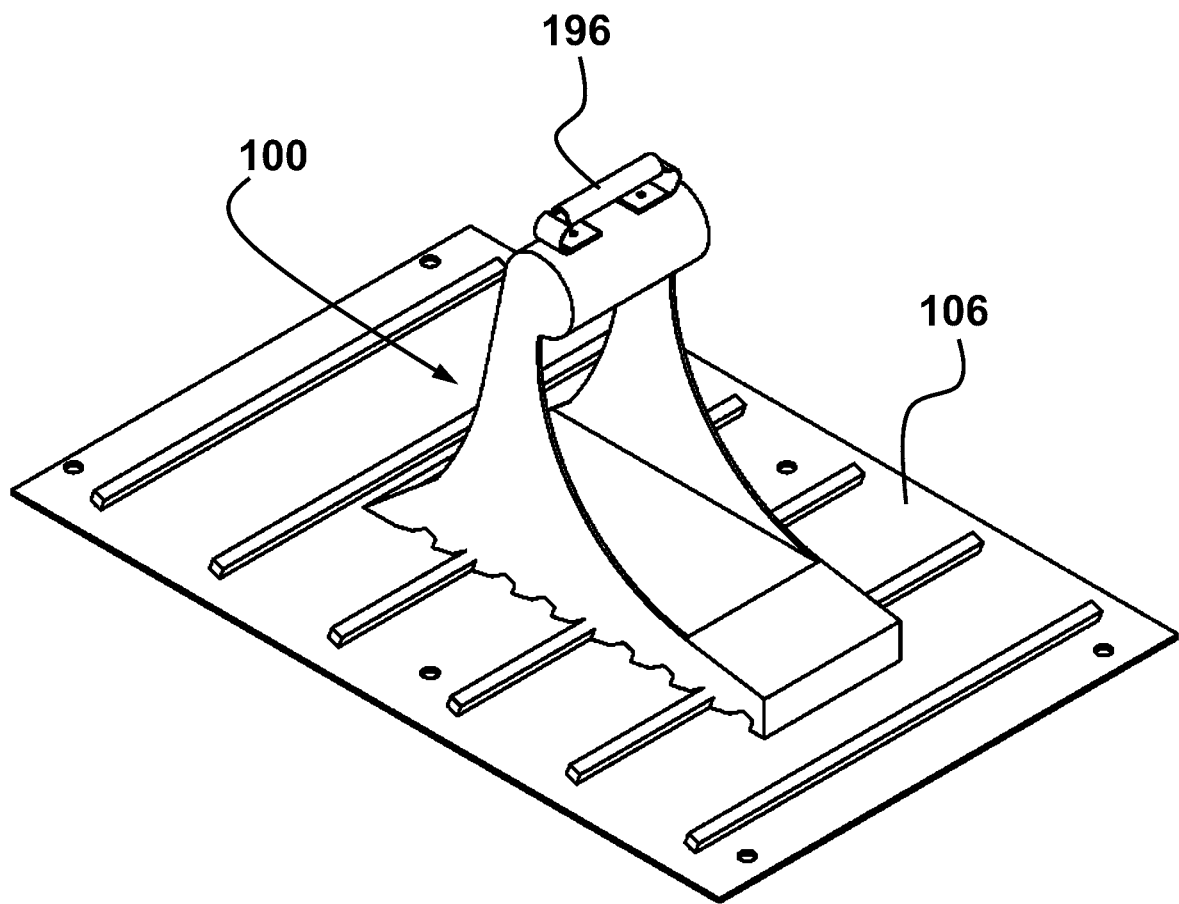
Figure 35:
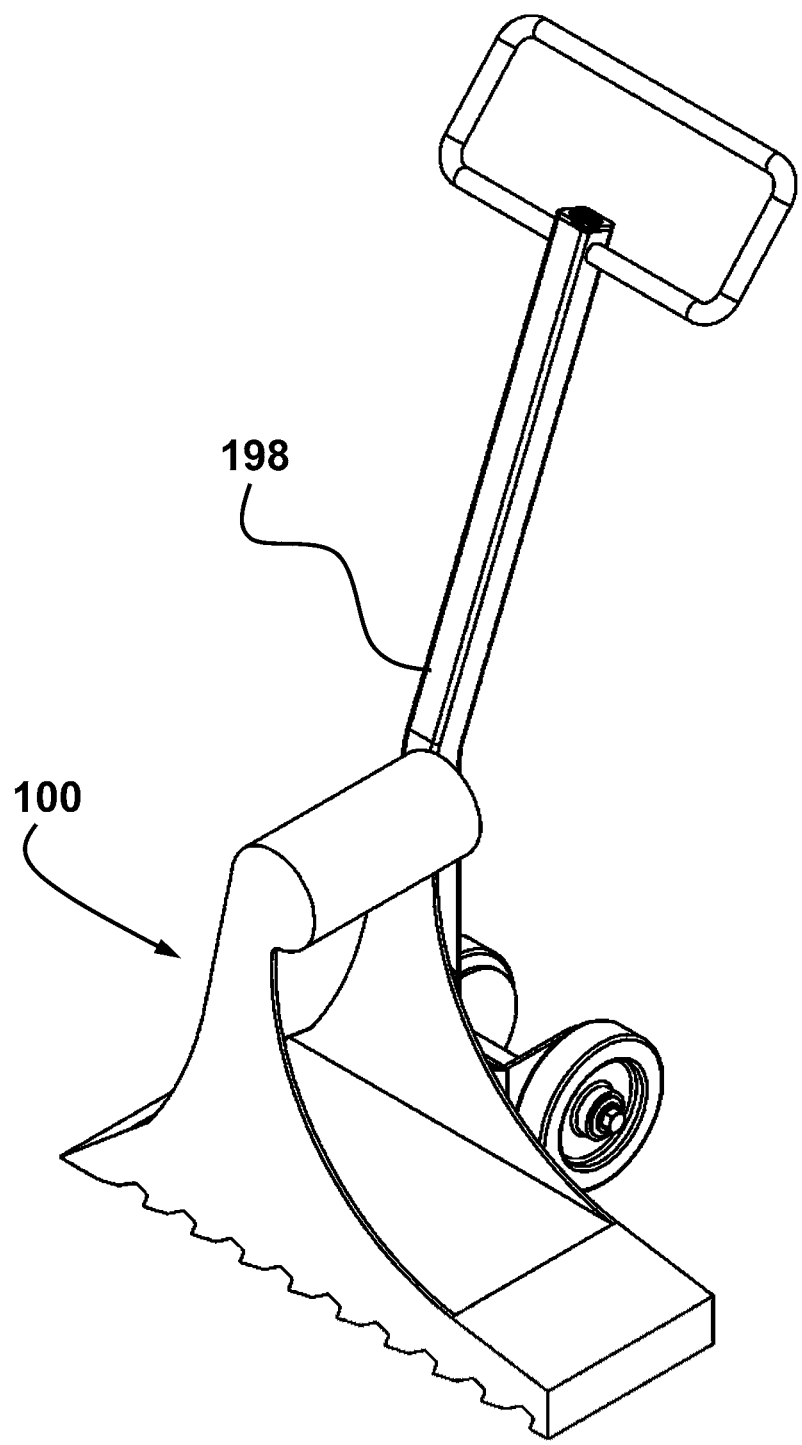

FIGS. 33 to 35 show examples of some of the features that can be used to help an operator in positioning the wheel chock 100 on or off the base plate 106.

FIG. 33 shows an example of an articulated spring-assisted arm 180 having a proximal end attached to the wall 112 by means of a first swivel device 182 and a distal end attached on the side of the main body 140 of the wheel chock 100 by a second swivel device 184. The arm 180 includes a proximal arm member 186 and a distal arm member 188. Both are pivotally connected together in juxtaposition using a hinge 190. A weight-supporting spring 192 extends between the first swivel device 182 and the proximal arm member 186 to counterbalance at least part of the weight of the wheel chock 100. The spring 192 can also be attached directly to the wall 112. In the illustrated example, the spring 192 is attached to the proximal arm member 186 using a tension adjustment device 194. This device 194 includes for instance a nut and screw arrangement to modify the tension of the spring 192. This can thus vary the tension, for instance to increase or decrease the counterbalancing force from the spring 192. Variants are possible as well.

FIG. 34 shows an example of the wheel chock 100 with a handle 196 mounted on top thereof. The handle 196 of this illustrated example is flexible in order not to interfere with tire deformation. Variants are possible as well.

FIG. 35 shows an example of a wheeled cart 198 attached to the wheel chock 100.

FIGS. 36 to 43 show examples of base plates 106 provided with a heating element therein that is capable of melting ice and snow in cold weather conditions.

Figure 36:
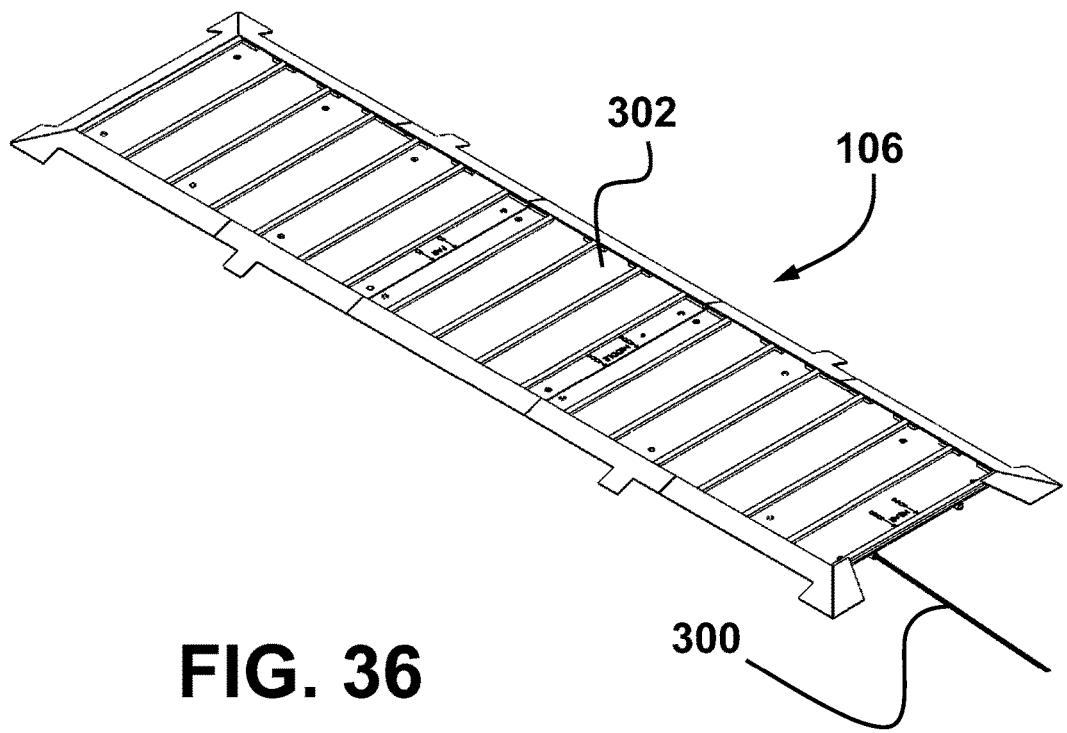
FIGS. 36 to 43 show examples of base plates provided with a heating element therein that is capable of melting a layer of ice or snow in cold weather conditions.
Figure 37:
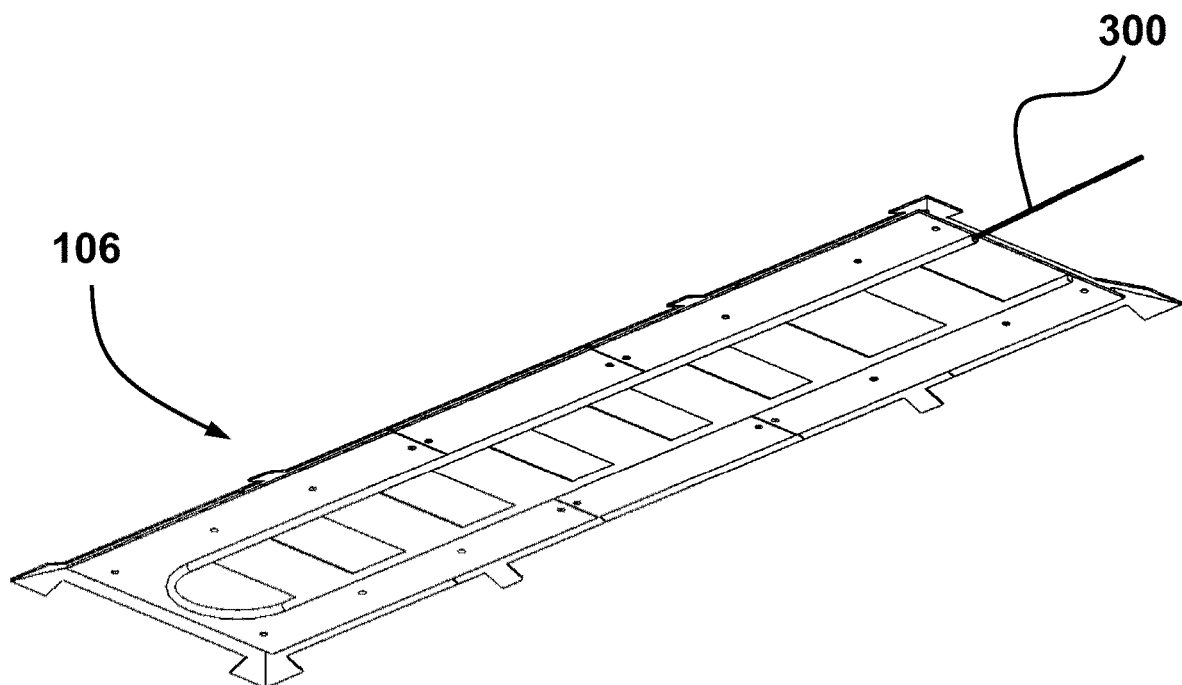

FIG. 36 is an upper isometric view of an example of a base plate 106 having a heating element 300 located under an upper plate. This heating element 300 can be for instance a self-regulating heating electrical cable. FIG. 37 is a bottom isometric view of the base plate 106 of FIG. 36.

Figure 38:
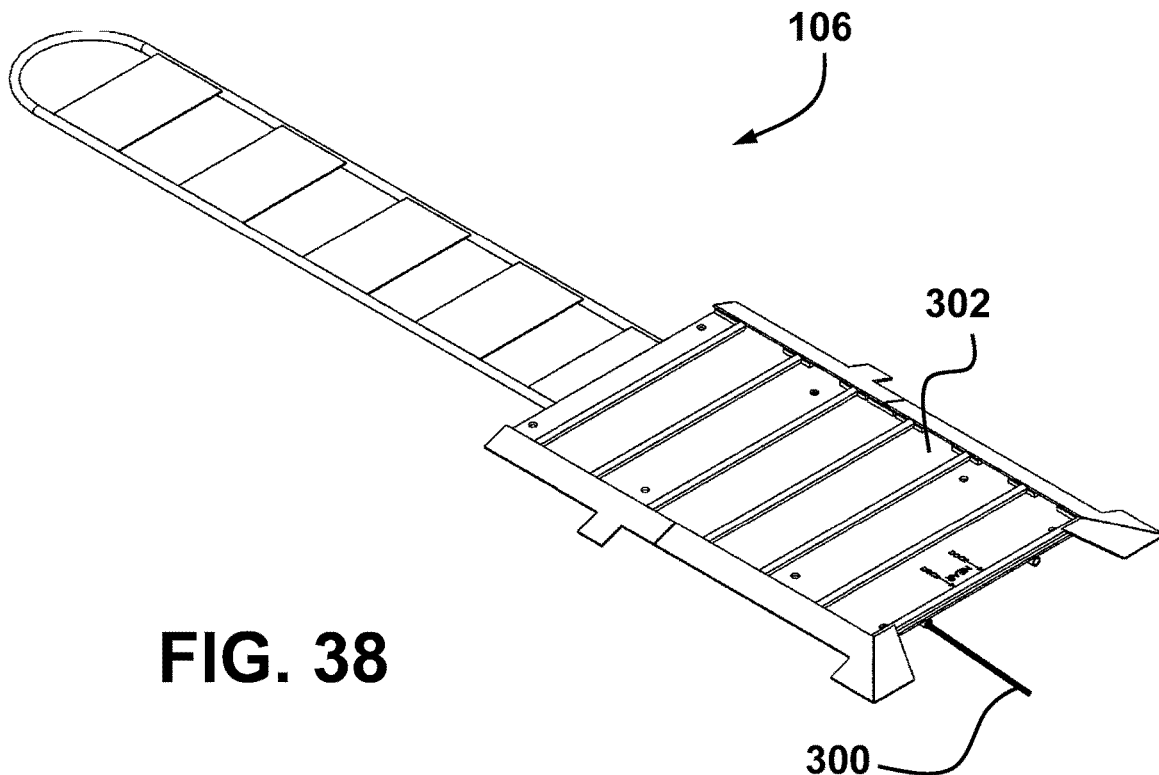
Figure 39:
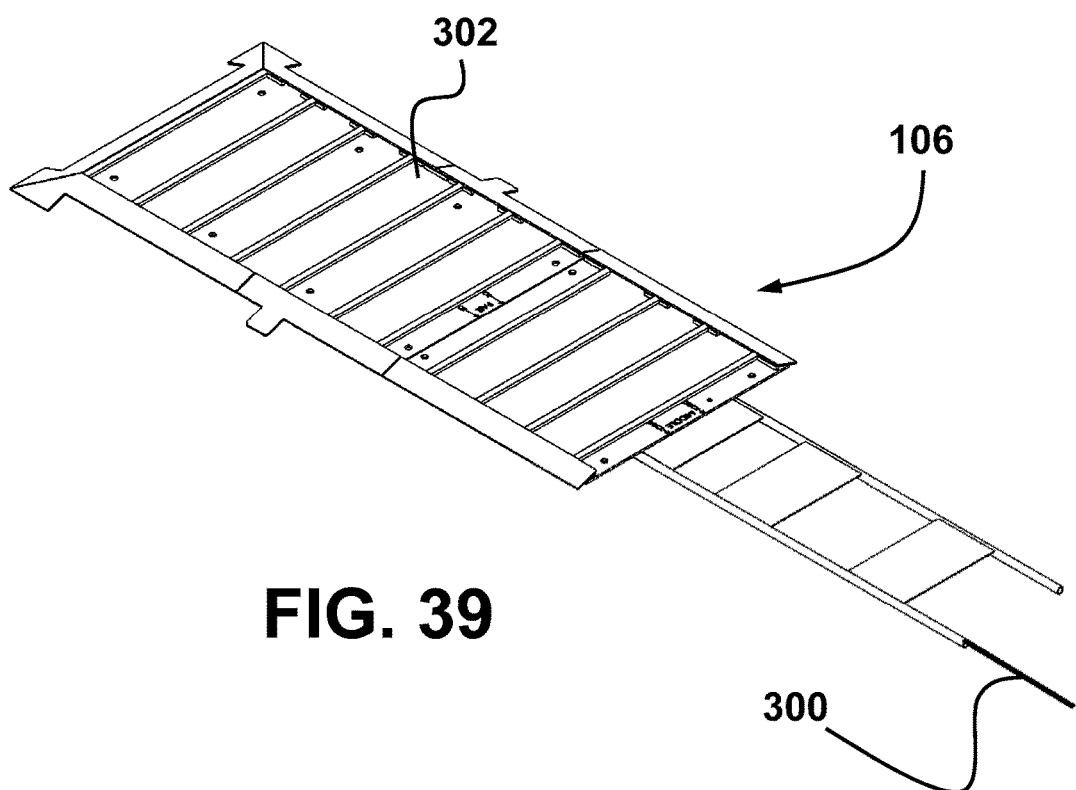

FIG. 38 is an upper isometric view of the base plate of FIG. 36, but with a first portion of the upper plate 302 being removed for the sake of illustration. FIG. 39 is also an upper isometric view of the base plate 106 of FIG. 36, but with a second portion of the upper plate 302 being removed to show another portion of the heating element 300 therein. This heating element 300 is in the form of a heating cable that runs through a U-shaped section of pipe. Heat is transferred to the ground plate through a series of plates attached directly to the underside of the base plate 106. This structure can also be buried in the ground under the base plate 106 to prevent any additional vertical height increase. Variants are possible as well.

Figure 40:
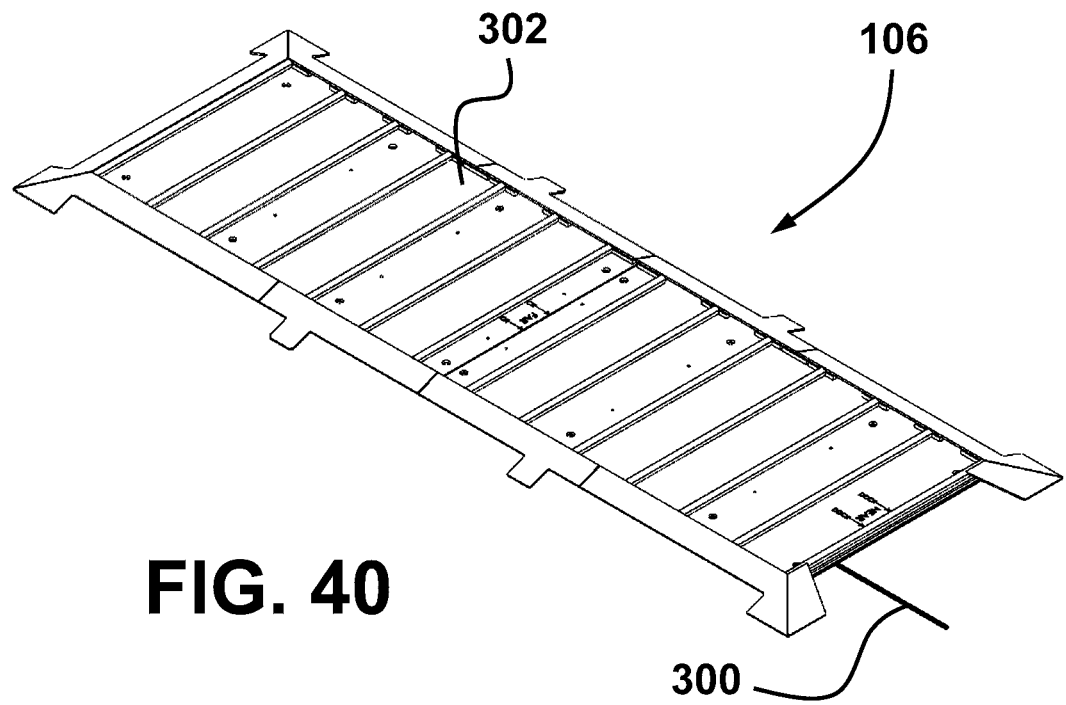
Figure 41:
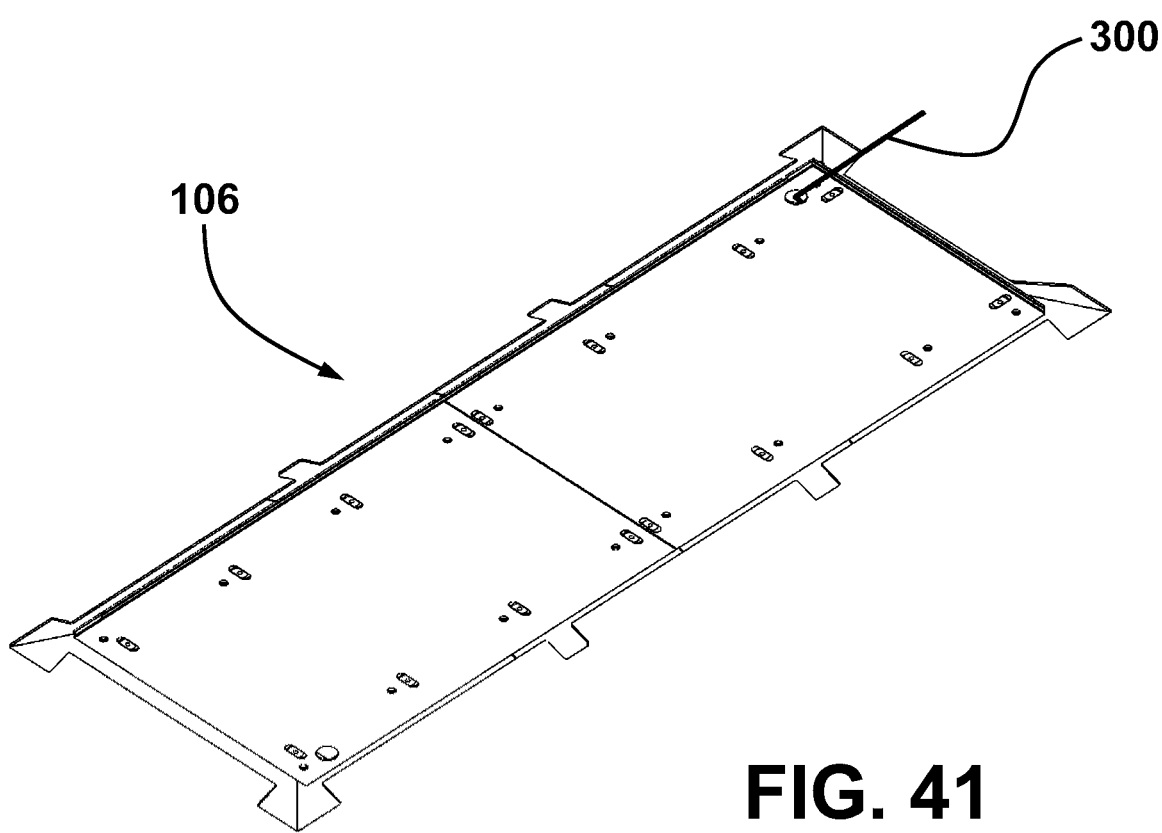

FIG. 40 is an upper isometric view of another example of a base plate 106 having a heating element 300 located under an upper plate. This heating element 300 can also be for instance a self-regulating heating electrical cable. FIG. 41 is a bottom isometric view of the base plate 106 of FIG. 40. The heating cable 300 runs between two steel plates with an internal structure to permit a back and forth path for the cable 300. Heat is transferred through a top steel plate which is connected directly to the underside of the base plate 106.

Figure 42:
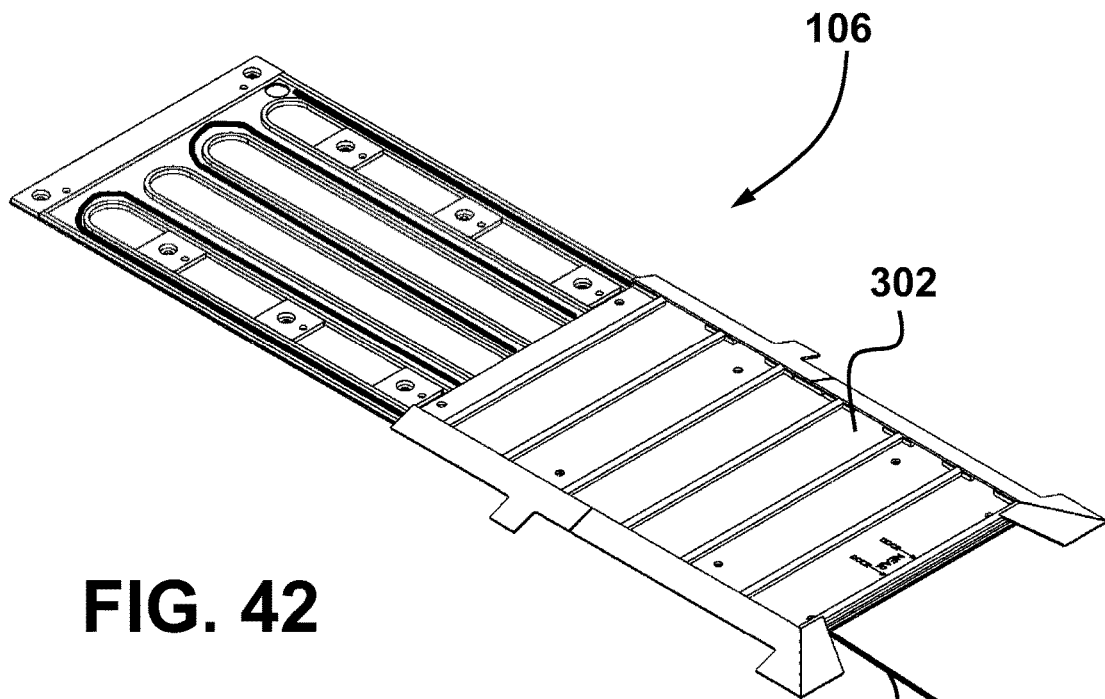
Figure 43:
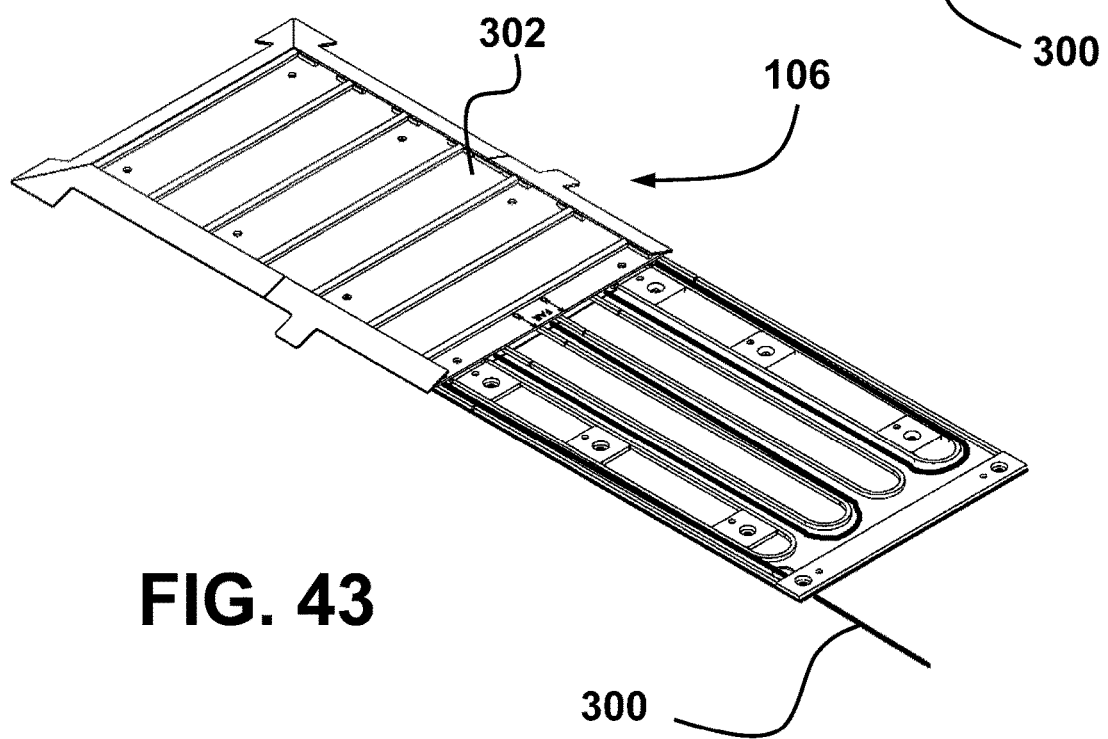
Figure 44:
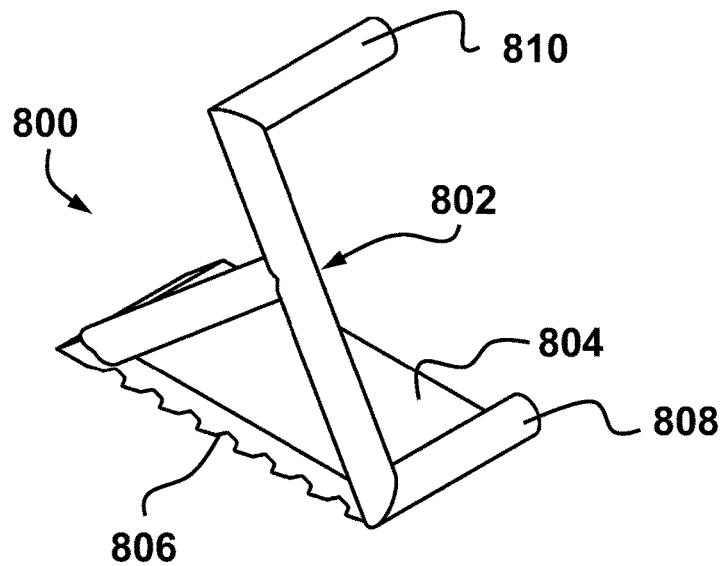
FIGS. 44 to 47 show another possible model of the wheel chock.
Figure 45:
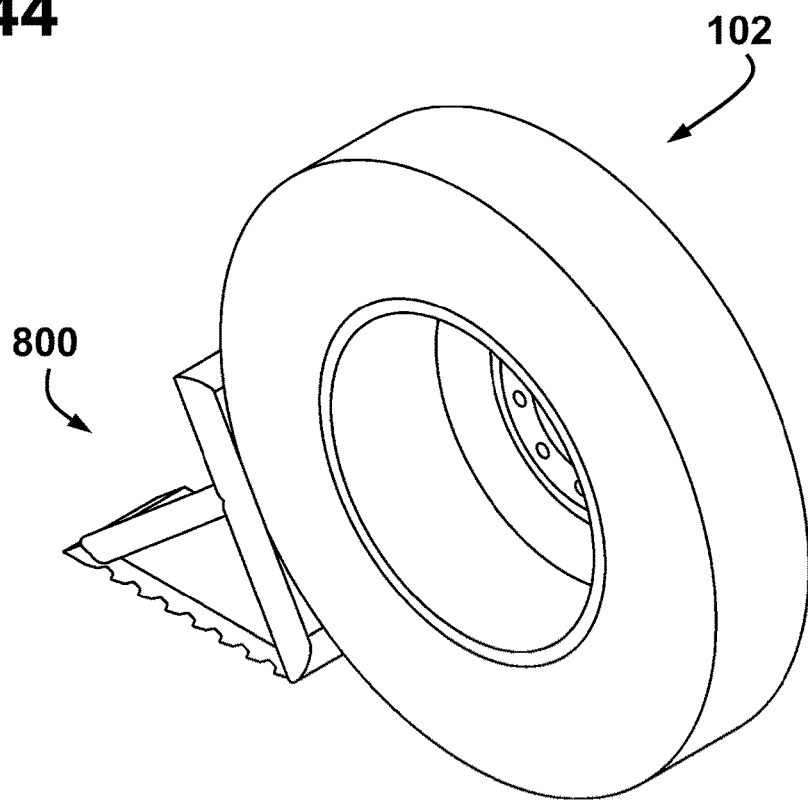
Figure 46:
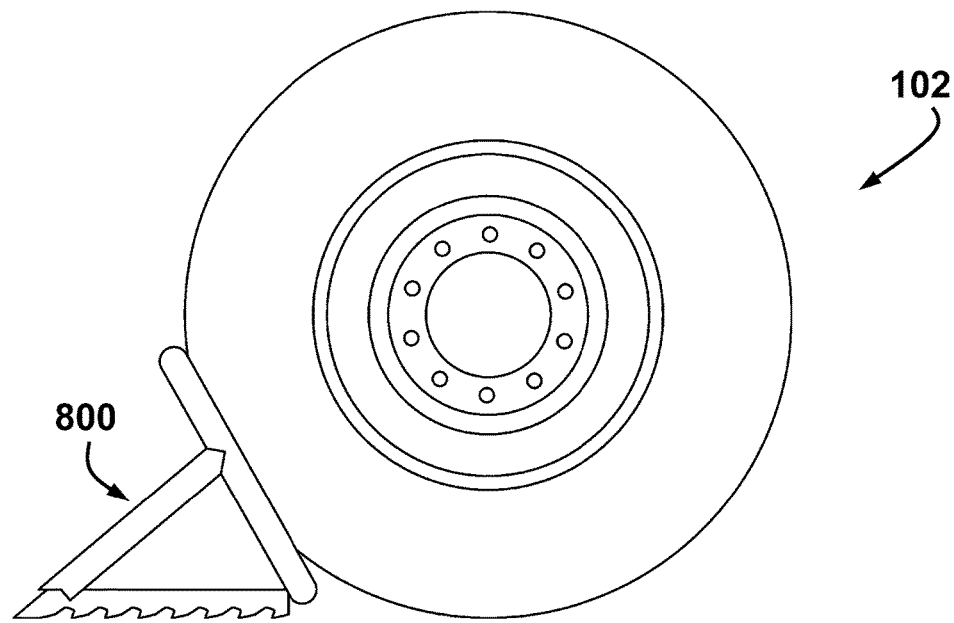
Figure 47:
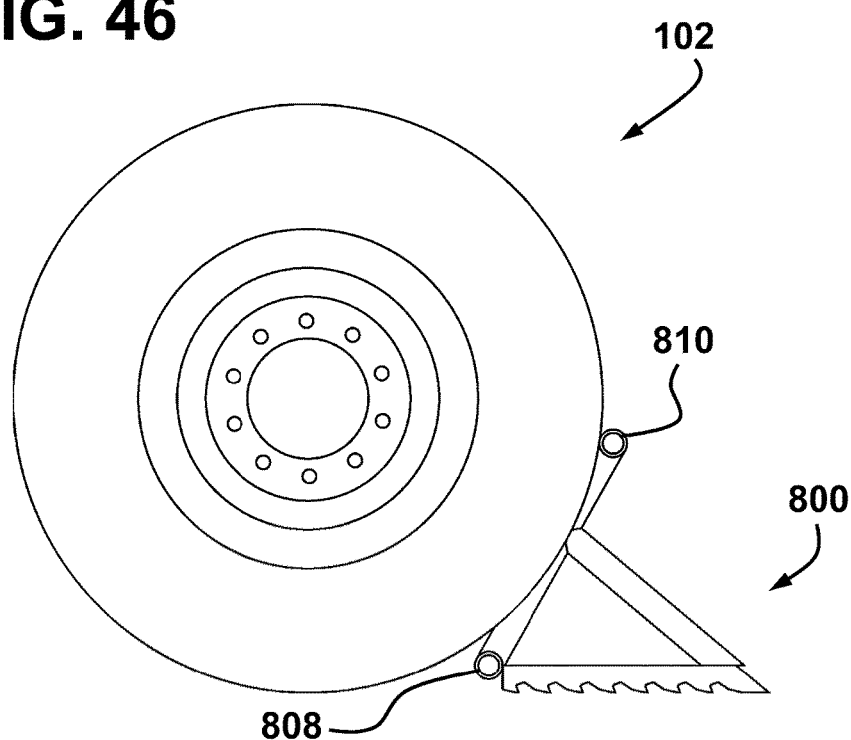

FIG. 42 is an upper isometric view of the base plate 106 of FIG. 40, but with a first portion of the upper plate being removed to show the heating element 300 therein. FIG. 43 is also an upper isometric view of the base plate 106 of FIG. 36, but with a second portion of the upper plate being removed to show another portion of the heating element therein.

FIGS. 44 to 47 show another possible model of a wheel chock 800. This wheel chock 800 includes an upper frame member 802, made of tubing or the like, and that is rigidly connected to a rigid bottom frame member 804. The underside of the bottom frame member 804 includes teeth 806 and the wheel chock 800 is designed to be set on a base plate, for instance the base plate 106 from the previous figures. Variants are possible as well.

The upper frame member 802 of the wheel chock 800 has two transversal members 808, 810. They are rigidly attached to the side portion of the upper frame member 802, which side portion has a shape that is somewhat similar to an inverted "Y". The tire deformation zone is formed between the two transversal members 808, 810.

As can be seen, the top transversal member 810 of the illustrated example is only attached at one end and the opposite end is a free end. The upper frame member 802 has one side that is completely open. This example shows that different kinds of constructions of the frame structure of the wheel chock can be devised, including constructions where the frame structure is not symmetric.

Figure 48:
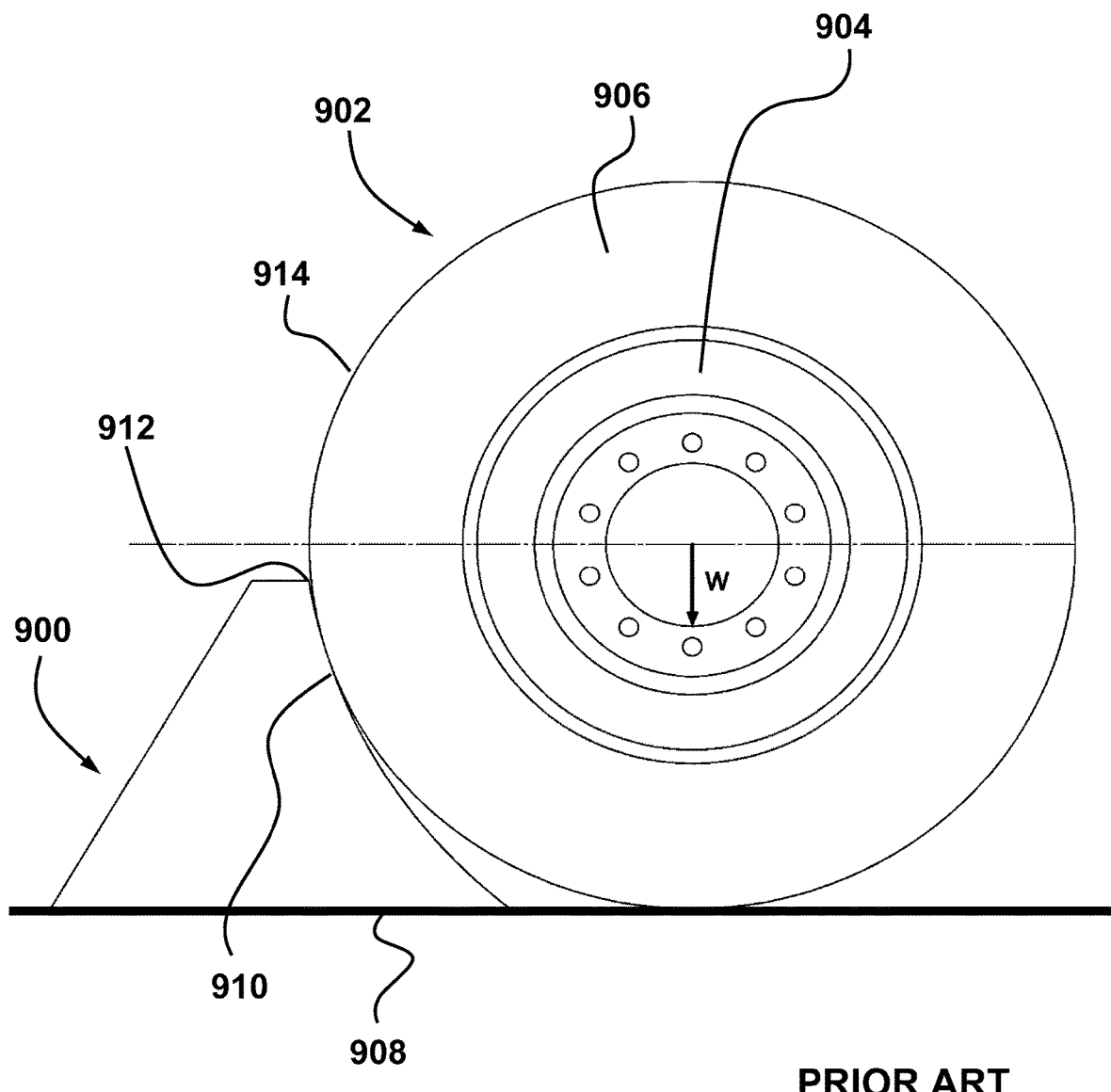
FIG. 48 is a semi-schematic side view illustrating an example of a conventional wheel chock at the time of initial contact with an example of a wheel of a vehicle.
Figure 49:
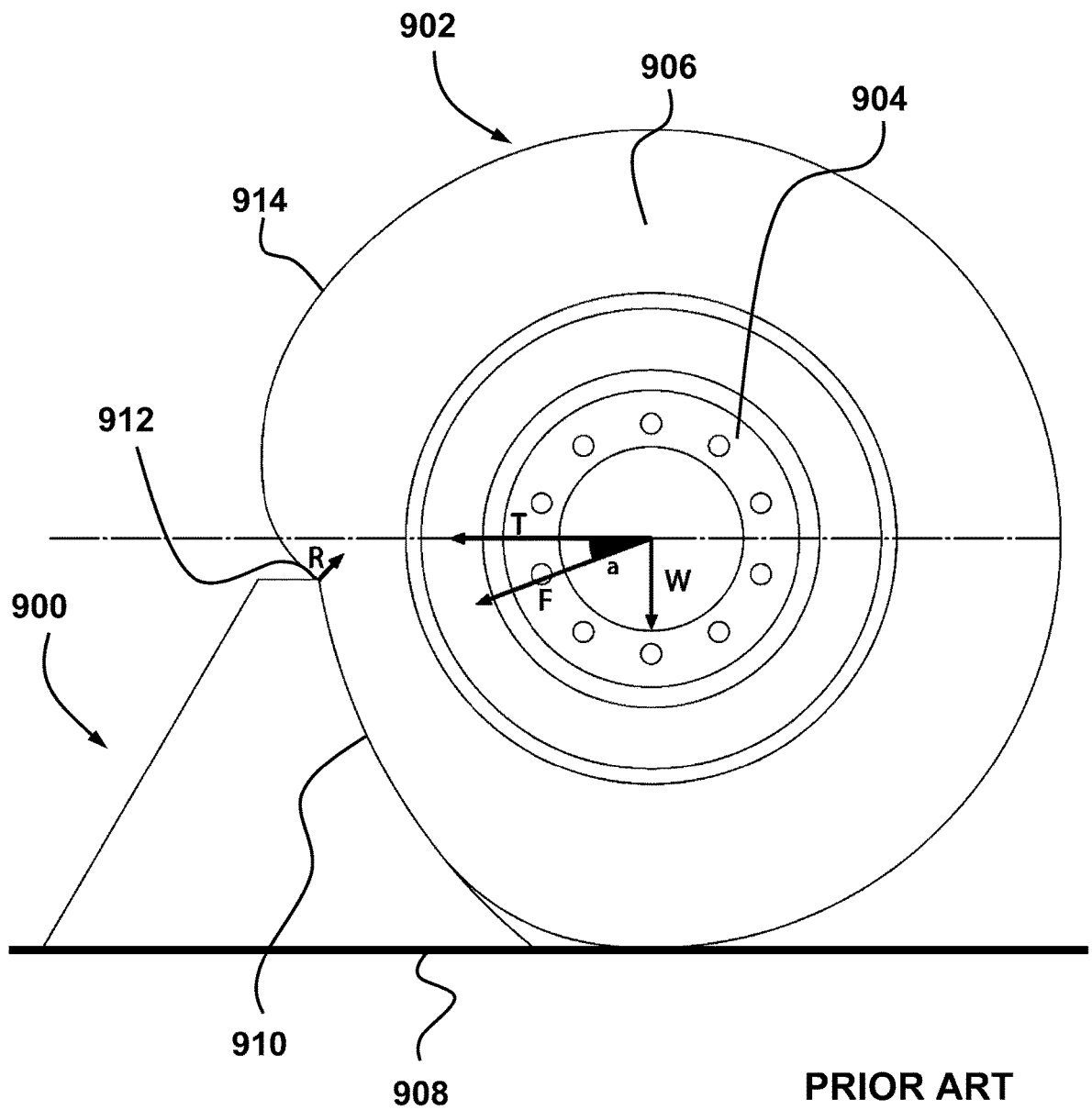
FIG. 49 is a view similar to FIG. 48 but showing the initial local deformation of the tire tread when a moderate horizontal force T is applied.
Figure 50:
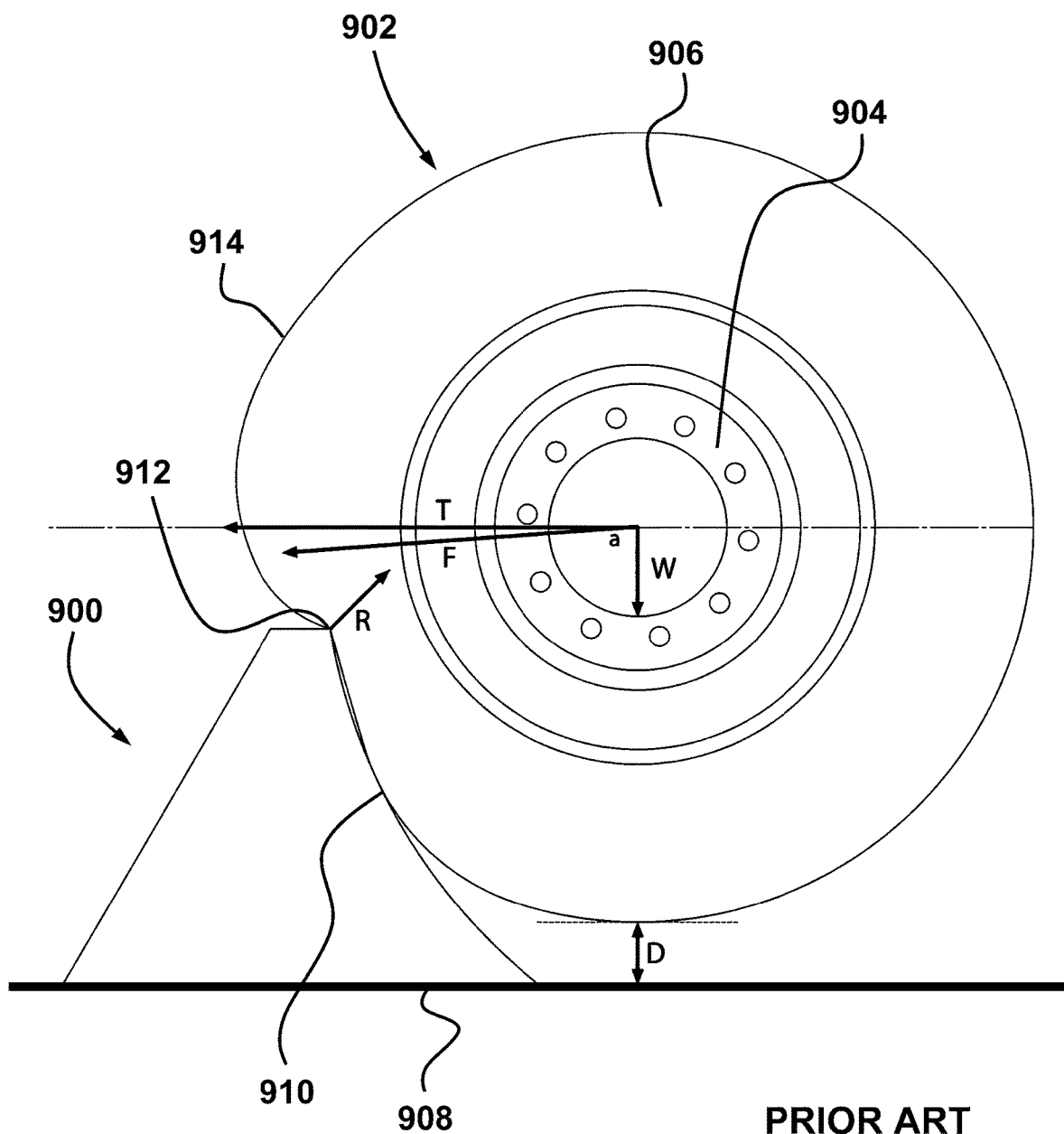
FIG. 50 is a view similar to FIG. 48 but showing what happens when a strong horizontal force T is applied.

FIGS. 48 to 50 were discussed in the background section. They are semi-schematic side views illustrating an example of a conventional wheel chock 900.

Tests were conducted on a test bench for comparison between an existing wheel chock model, similar to that of FIGS. 48 to 50, of 20 inches (50.8 cm) in height and a wheel chock similar for instance to the wheel chock 100 in FIGS. 1 and 3, of 20 inches (50.8 cm). The wheel was a gas-inflated tire of 42 inches (122 cm) in diameter and the local weight W was set to 2,300 lbs. (1043 kg) in both cases to simulate a lightly loaded trailer. It was measured that with the conventional wheel chock, a roll over occurred with a horizontal force T of about 11,400 lbs. (5,170 kg). However, no rollover occurred with the newly designed wheel chock for the same horizontal force T. The horizontal force T was increased up to 20,600 lbs. (9,344 kg) and still, no rollover occurred. The tire showed signs of an imminent failure, and the horizontal force T was not further increased for that reason. It was clear that the rollover was not an issue and that the tire itself was the weak point.

Other tests were conducted on the test bench for comparison between a relatively small conventional wheel chock of 14 inches (35.5 cm) in height and a proposed wheel chock of 14 inches (35.5 cm) that was somewhat similar to that of FIGS. 7 and 8. The wheel was also a gas-inflated tire of 42 inches (122 cm) in diameter and the weight W was set to 2,300 lbs. (1043 kg) in both cases. It was measured that with the conventional wheel chock, a roll over occurred with a horizontal force T of about 6,000 lbs. (2,721 kg). However, no roll over occurred with the proposed wheel chock for the same horizontal force T. The horizontal force T was increased up to 8,400 lbs. (3,810 kg) and a roll over then occurred since the wheel chock was relatively small compared to the diameter of the wheel in the test (42 inches, 122 cm). Nevertheless, the maximum horizontal force T was 40% more than that of the conventional wheel chock, which is a significant improvement.

Overall, wheel chocks designed and constructed as disclosed herein will perform better than conventional wheel chocks of the same size.

The present detailed description and the appended figures are meant to be exemplary only, and a skilled person will recognize that many changes can be made while still remaining within the proposed concept.

LIST OF REFERENCE NUMERALS 100 wheel chock
102 wheel
104 trailer
106 base plate
108 departure direction
110 loading dock
112 wall
114 cargo compartment
116 adjacent wheel
120 rotation axis
130 rim
132 tire
134 sidewall
136 tire tread
138 ground surface
140 main body
142 side member
144 bottom base portion
146 tire-facing side
148 tire deformation cavity
150 tire-engaging bulge
152 recessed tire-facing surface
160 bulge engagement point
162 local deformation
164 bottom tire-engaging point 170 upper portion
172 lower leading quadrant
174 horizontal wheel centerline
176 vertical wheel centerline
178 vertical distance
180 articulated spring-assisted arm
182 first swivel device
184 second swivel device
186 proximal arm member
188 distal arm member
190 hinge
192 spring
194 tension adjustment device
196 handle
198 wheeled cart
202 tooth (wheel chock)
204 tooth (base plate)
206 bracket
210 common horizontally extending surface
500 wheel chock
502 tire deformation cavity
504 tire-engaging bulge
800 wheel chock
802 upper frame member
804 bottom frame member
806 tooth
808 bottom transversal member
810 top transversal member
900 conventional wheel chock
902 wheel
904 rim
906 tire
908 ground surface
910 contact surface
912 upper edge
914 tire tread

What is claimed is:

1. A method for blocking a wheel using a wheel chock placed over a ground-anchored base plate, the wheel chock including a main body having a tire-facing side and a tire deformation cavity provided on the tire-facing side, the wheel including a rigid rim around which is mounted a tire having a circumferentially disposed resilient tire tread, the tire tread having an undeformed state and a substantially circular outer shape when away from the wheel chock, the method including:

establishing a latched engagement between the wheel chock and the base plate to set the wheel chock in a tire blocking position, the wheel chock including a tire-engaging bulge located substantially at a top end of the main body and projecting from the tire-facing side immediately above the tire deformation cavity;

once the latched engagement is established, bringing the tire tread into direct contact with the tire-engaging budge and pressing the wheel onto the wheel chock to initiate a local radial deformation of the tire tread and bring the tire tread into a deformed state, the tire tread initially engaging the tire-engaging budge at a bulge engagement point;

further pressing the wheel onto the wheel chock to create a sizable disruption in the circular outer shape and receiving a portion of the deformed tire tread into the tire deformation cavity provided under the tire-engaging budge, the wheel exerting a horizontal force that is combined with a vertical local weight force acting on the wheel to create a resultant force vector at a center of the wheel, the wheel chock being configured and disposed to help maintain the resultant force vector in a path passing below the top end of the main body so as to substantially prevent the wheel from moving upwards relative to the wheel chock and ultimately rolling over the wheel chock; and wherein the main body of the wheel chock includes a bottom base portion having a bottom tire-engaging point, the bottom tire-engaging point being spaced apart from the tire tread when the tire tread initially contacts the bulge engagement point on the tire-engaging budge.

2. The method as defined in claim 1, wherein bringing the tire tread into direct contact with the tire-engaging budge involves initially engaging the bulge engagement point using an upper portion of a lower leading quadrant of the wheel.

3. The method as defined in claim 2, wherein the upper portion of the lower leading quadrant of the wheel has a lower boundary that is at a maximum vertical distance from a horizontal wheel centerline of about 15% of a diameter of the wheel.

4. The method as defined in claim 1, wherein the tire deformation cavity extends from the tire-engaging bulge down to the bottom tire-engaging point on the bottom base portion.

5. The method as defined in claim 4, wherein the tire deformation cavity has a recessed curved shape at least in an upper section immediately below the tire-engaging bulge.

6. The method as defined in claim 5, wherein the curved shape of the upper section of the tire deformation cavity has a minimum radius that is at least half of a diameter of the wheel.

7. The method as defined in claim 1, wherein establishing the latched engagement between the wheel chock and the base plate involves removably attaching an underside of the main body of the wheel chock to an upper surface of the base plate.

8. The method as defined in claim 7, wherein the underside of the main body includes a plurality of spaced apart and substantially downwardly projecting teeth, and wherein the upper surface of the base plate includes a plurality of spaced apart and substantially upwardly projecting teeth, at least one of the teeth under the main body being in a latching engagement with at least one of the teeth provided on the base plate when the wheel chock is in a tire blocking position.

9. The method as defined in claim 8, wherein the latching engagemenr between corresponding teeth under the main body and on the base plate provides resistance to an upward lifting force created when the wheel is pressed onto the wheel chock.

10. The method as defined in claim 9, wherein at least one of the teeth of the base plate includes a transversally extending element that is rigidly attached to the upper surface of the base plate.

11. The method as defined in claim 1, wherein the tire-engaging bulge includes a rounded outer surface having an upper surface portion and a bottom surface portion, the bottom surface portion being opposite the upper surface portion.

12. The method as defined in claim 1, wherein the tire deformation cavity has a depth that is at least about 30% of a tire sidewall height at a deepest location of the tire deformation cavity.

13. The method as defined in claim 1, further including:
providing heat using a heating element located under the base plate to melt snow or ice on an upper surface of the base plate.

14. The method as defined in claim 13, wherein providing the heat involves using a self-regulating heating electrical cable.

15. A method for blocking a wheel using a wheel chock placed over a ground-anchored base plate, the wheel chock including a main body having a tire-facing side and a tire deformation cavity provided on the tire-facing side, the wheel including a rigid rim around which is mounted a tire having a circumferentially disposed resilient tire tread, the tire tread having an undeformed state and a substantially circular outer shape when away from the wheel chock, the method including:
establishing a latched engagement between the wheel chock and the base plate to set the wheel chock in a tire blocking position, the wheel chock including a tire-engaging bulge located substantially at a top end of the main body and projecting from the tire-facing side immediately above the tire deformation cavity;
once the latched engagement is established, bringing the tire tread into direct contact with the tire-engaging budge and pressing the wheel onto the wheel chock to initiate a local radial deformation of the tire tread and bring the tire tread into a deformed stare, the tire tread initially engaging the tire-engaging budge at a bulge engagement point;
further pressing the wheel onto the wheel chock to create a sizable disruption in the circular outer shape and receiving a portion of the deformed tire tread into the tire deformation cavity provided under the tire-engaging budge, the wheel exerting a horizontal force that is combined with a vertical local weight force acting on the wheel to create a resultant force vector at a center of the wheel, the wheel chock being configured and disposed to help maintain the resultant force vector in a path passing below the top end of the main body so as to substantially prevent the wheel from moving upwards relative to the wheel chock and ultimately rolling over the wheel chock; and
wherein the tire deformation cavity has a depth that is at least about 30% of a tire sidewall height at a deepest location of the tire deformation cavity.

16. The method as defined in claim 15, wherein bringing the tire tread into direct contact with the tire-engaging budge involves initially engaging the bulge engagement point using an upper portion of a lower leading quadrant of the wheel.

17. The method as defined in claim 16, wherein the upper portion of the lower leading quadrant of the wheel has a lower boundary that is at a maximum vertical distance from a horizontal wheel centerline of about 15% of a diameter of the wheel.

18. The method as defined in claim 15, wherein the tire deformation cavity extends from the tire-engaging bulge down to the bottom tire-engaging point on the bottom base portion.

19. The method as defined in claim 18, wherein the tire deformation cavity has a recessed curved shape at least in an upper section immediately below the tire-engaging bulge.

20. The method as defined in claim 19, wherein the curved shape of the upper section of the tire deformation cavity has a minimum radius that is at least half of a diameter of the wheel.

21. The method as defined in claim 15, wherein establishing the latched engagement between the wheel chock and the base plate involves removably attaching an underside of the main body of the wheel chock to an upper surface of the base plate.

22. The method as defined in claim 21, wherein the underside of the main body includes a plurality of spaced apart and substantially downwardly projecting teeth, and wherein the upper surface of the base plate includes a plurality of spaced apart and substantially upwardly projecting teeth, at least one of the teeth under the main body being in a latching engagement with at least one of the teeth provided on the base plate when the wheel chock is in a tire blocking position.

23. The method as defined in claim 22, wherein the latching engagement between corresponding teeth under the main body and on the base plate provides resistance to an upward lifting force created when the wheel is pressed onto the wheel chock.

24. The method as defined in claim 23, wherein at least one of the teeth of the base plate includes a transversally extending element that is rigidly attached to the upper surface of the base plate.

25. The method as defined in claim 15, wherein the tire-engaging bulge includes a rounded outer surface having an upper surface portion and a bottom surface portion, the bottom surface portion being opposite the upper surface portion.

26. The method as defined in claim 15, further including:
providing heat using a heating element located under the base plate to melt snow or ice on an upper surface of the base plate.

27. The method as defined in claim 26, wherein providing the heat involves using a self-regulating heating electrical cable.

* * * * *